United States Patent
Naganuma et al.

(10) Patent No.: US 7,459,813 B2
(45) Date of Patent: Dec. 2, 2008

(54) MAGNET ROTOR AND ELECTROMAGNETICALLY-DRIVING DEVICE USING THE SAME, AND OPTICAL APPARATUS WITH LIGHT QUANTITY-CONTROL DEVICE

(75) Inventors: Hiroaki Naganuma, Kofu (JP); Tokuro Kusunoki, Koshu (JP)

(73) Assignee: Nisca Corporation, Minamikoma-Gun, Yamanashi (JP)

( * ) Notice: Subject to any disclaimer, the term of this patent is extended or adjusted under 35 U.S.C. 154(b) by 327 days.

(21) Appl. No.: 11/513,311

(22) Filed: Aug. 31, 2006

(65) Prior Publication Data
US 2007/0159030 A1    Jul. 12, 2007

(30) Foreign Application Priority Data
Jan. 12, 2006    (JP) .............................. 2006-005390

(51) Int. Cl.
*H02K 37/14* (2006.01)
(52) U.S. Cl. ...................... 310/49 R; 310/50; 310/75 B
(58) Field of Classification Search ............... 310/49 R, 310/50, 75 B, 89, 91, 156.01; 259/199, 213
See application file for complete search history.

(56) References Cited

U.S. PATENT DOCUMENTS

| 4,194,226 | A | * | 3/1980 | Kaseta et al. | 360/264.6 |
| 4,227,092 | A | * | 10/1980 | Campagnuolo et al. | 290/1 C |
| 4,701,835 | A | * | 10/1987 | Campagnuolo et al. | 362/192 |
| 5,581,422 | A | * | 12/1996 | Umehara | 360/97.01 |
| 5,694,621 | A | * | 12/1997 | Dowe et al. | 396/25 |
| 6,501,357 | B2 | * | 12/2002 | Petro | 335/229 |
| 6,822,809 | B2 | * | 11/2004 | Yokoyama | 359/696 |
| 2002/0060856 | A1 | * | 5/2002 | Yokoyama | 359/696 |
| 2005/0146637 | A1 | * | 7/2005 | Kawauchi | 348/363 |
| 2007/0008502 | A1 | * | 1/2007 | Lee et al. | 353/97 |

FOREIGN PATENT DOCUMENTS

| JP | 2002-49076 | 1/2002 |
| JP | 2004-334038 | 11/2004 |

* cited by examiner

Primary Examiner—Thanh Lam
(74) Attorney, Agent, or Firm—Manabu Kanesaka

(57) ABSTRACT

An electromagnetic device includes a magnet rotor having a rotary shaft and a stator having an excitation coil configured to apply a rotation force to the rotor. The magnet rotor includes a hollow cylindrical permanent magnet, a rotary shaft disposed in a hollow space portion of the permanent magnet, and a driving arm that rotates around the rotary shaft integrally with the permanent magnet. The magnet and driving arm are reliably secured, not easily separated during use, and includes a structure that facilitates machining and assemble.

8 Claims, 16 Drawing Sheets

MAGNET ROTOR AND ELECTROMAGNETICALLY-DRIVING DEVICE USING THE SAME, AND OPTICAL APPARATUS WITH LIGHT QUANTITY-CONTROL DEVICE

BACKGROUND OF THE INVENTION AND RELATED ART STATEMENT

The present invention relates to an optical apparatus for an image pickup system such as a video camera or still camera, a projection system such as a projector or a rear-projection TV, and the like. More specifically, it relates to a light quantity-control device for regulating the quantity of light in association with the optical apparatus and a magnet rotor used as a driving power source for the light quantity-control device.

In general, a light quantity-control device incorporated in an optical apparatus, i.e., camera and projector devices, is widely used as a shutter device or a light-limiting device. Such devices have a frame substrate (bottom board) placed at a midway position in an optical path and a thin plate-shaped blade member openably mounted on the frame substrate, wherein the shutter device opens and closes the blade member thereby adjusting the quantity of light passing therethrough or cut the optical path.

The light-limiting device further operates to regulate, i.e., increasing and decreasing, the quantity of light. The blade member includes one or more blades, and is pivotably or slidably supported around an optical path aperture formed in the frame substrate. The one or more blades are driven by an electromagnetically-driving device operable to open and close the blades.

An electromagnetically-driving device may include a magnet rotor with a permanent magnet and a stator coil having an excitation coil for applying a rotation force to the rotor. An electromagnetically-driving device like this may provide a device, such as a camera device for cellular telephones, with reductions in size and weight, and power consumption. Such savings have been demanded as key technical issues, and various proposals for downsizing of the device have been made.

Patent Document 1, JP-A-2004-334038, discloses a rotor including a cylindrical permanent magnet integrated with a rotary shaft and supported rotatably with respect to a coil frame. A coil is wound on an external circumference of the coil frame, and an external circumference of the coil frame thus formed is shielded by a yoke.

However, the structure has the feature that as the driving device, and particularly its core part, become larger in diameter, the rotary shaft arranged in its center, the permanent magnet arranged around an external circumference of the rotary shaft, the coil frame and coil arranged around an external circumference of the permanent magnet, and the yoke arranged around an external circumference of the coil frame with the coil, likewise becomes larger.

The rotary shaft is press-fitted into a center shaft bore formed in the magnet, or is secured by an adhesive. According to Patent Document 1, a narrowed portion is formed in the rotary shaft along a diameter thereof and the adhesive is filled in the narrowed portion, thereby preventing the adhesive from flowing out. However, downsizing the device makes the diameter of the rotary shaft smaller, which poses a difficult problem in machining the rotary shaft.

Patent Document 2, JP-A-2002-049076, discloses a method of forming a magnetic pole using a strip of a soft magnetic material to lead the magnetism generated by an annular excitation coil to a hollow magnet rotor, wherein the magnet rotor and excitation coil are arrayed vertically in a direction of the shaft.

Patent Document 2 further discloses wherein the magnet rotor is formed in a hollow cylindrical shape and an inside yoke and an outside yoke are arranged in a central aperture portion of the rotor and in an outer peripheral portion, respectively, so that each of them surrounds the magnet of the rotor. The inside and outside yokes lead a magnetic force from a coil to the surrounding of the magnet. The location of the magnetic force is different from the location where the magnet rotor is located, thus generating the rotation force.

An electromagnetically-driving device like this has the structure in which a thin plate-shaped outside yoke is disposed around an external circumference of a hollow magnet rotor and a sleeve-like inside yoke is provided inside the magnet rotor. Therefore the device can be downsized by reducing the outer diameter of the device. In addition, the outer diameter of the magnet rotor can be made relatively larger, and therefore a larger rotation force can be achieved. (This is because a coil frame and coil are not provided around an external circumference of the rotor.)

As for a magnetic circuit constituted along a direction of the flow of magnetism, the outside yoke, magnet rotor and inside yoke, the gap between the outside yoke and magnet rotor and the gap between the magnet rotor and inside yoke can be minimized within the bounds of allowing the rotation of the rotor. Therefore, the magnetic circuit has the following feature: the permanence of the whole magnetic circuit is high enough to reduce the electric power consumption.

As disclosed by the magnet rotor in the above-described electromagnetically-driving device, the magnet is secured to the rotary shaft, and a driving arm is integrated with the rotary shaft. Production methods of integrating the driving arm, rotary shaft and magnet include the following. The first is a method of integrally molding the driving arm and rotary shaft out of a resin, for example, and then performing insert molding thereof when the magnet is shaped. The second is a method of securing the driving arm and rotary shaft, each of which has been integrally molded, to the magnet by an adhesive. The third is a method of press-fitting the rotary shaft into the shaft bore of the magnet thereby to secure the rotary shaft to the magnet.

As for the first method, i.e. the insert molding method, when the diameter of the rotary shaft is reduced to approximately 1 to 3 mm in order to downsize an electromagnetically-driving device, it becomes difficult to design a molding die. At the same time, it is difficult to handle a tiny molded article, and the skill and troublesome work are required for insert molding. In the second case, where the rotary shaft and driving arm are secured to the magnet by an adhesive, there is the problem that include, for example, outflow of the adhesive lading to a defective operation. Also, in the case of securing by press-fit, there is the problem of the magnet damaged at the time of press-fitting. In addition, there is the problem of difficulty of molding a rotary shaft which is made finer increasingly.

Furthermore, in the method disclosed by Patent Document 2, which allows the rotary shaft to be constructed so as to have a relatively larger diameter, the driving arm and rotary shaft are integrally molded and secured to the magnet. While the securing method is not disclosed in the document, problems as described above arise when a conventionally used securing method, e.g., press-fit, adhesive bonding, or insert molding, is adopted.

Therefore, with any conventional method, there have been the following problems in securing the rotary shaft to the magnet. The first problem is that the fragile magnet is often damaged during assemble in the case of the securing method by press-fit. The second problem is that outflow of the adhesive leads to a defective operation in the case of the securing method by an adhesive. The third problem is that in the case of the insert molding, the raw material of the magnet is limited to resin materials and therefore it is impossible to mold form a ferromagnetic magnet.

The problems in connection with the above methods become more serious, synergistically, as the outer diameter of the magnet rotor is reduced in order to downsize an electromagnetically-driving device. Particularly, when the diameter of the rotary shaft is made smaller, the area of the bonding face is reduced affecting the securing by an adhesive, securing by press-fit, and insert securing. This poses the problem of ease of detachment owing to, for example, the change in environmental temperature, which leads to a failure during use.

Therefore, it is a major object of the invention to provide a magnet rotor, in which the magnet and driving arm are secured reliably, and not easily separated during use, and which has a simple structure and is easy to machine and assemble. Further, it is an object of the invention to provide an electromagnetically-driving device and a magnet rotor that can be downsized and whose rotary shaft can be made relatively larger in diameter.

SUMMARY OF THE INVENTION

The invention adopts the following arrangements in order to solve the problems. One aspect of an electromagnetically-driving device comprises a magnet rotor having a rotary shaft and a stator including an excitation coil for applying a rotation force to a rotor. The magnet rotor includes a hollow cylindrical permanent magnet, a rotary shaft disposed in a hollow space portion of the permanent magnet and a driving arm which rotates around the rotary shaft integrally with the permanent magnet.

The rotary shaft or permanent magnet is rotatably supported by a pair of upper and lower rotor supporting members. The rotor supporting members are composed of a bottom plate and cover plate, for example, which constitute parts of an outer housing of an electromagnetically-driving device.

In an upper end face of the permanent magnet, first fitting parts each composed of a protrusion or concave groove are formed in a direction of the rotary shaft. Second fitting parts, each composed of a protrusion or concave groove mating with the corresponding first fitting part, are formed in the driving arm. In such arrangement, when the permanent magnet is supported between the supporting faces of the paired upper and lower rotor supporting members, the depth of fitting of the first and second fitting parts is set so that the length of a combination of the permanent magnet and driving arm is longer than the length of distance between the upper and lower supporting faces. Accordingly when each first fitting part is composed of a concave groove and each second fitting part is composed of a protrusion, for example, the setting is made so that the total lengths of the permanent magnet and driving arm is larger than the distance between the paired upper and lower rotor supporting members.

After the permanent magnet is mounted between the paired upper and lower rotor supporting members, the permanent magnet and driving arm are reliably coupled to each other through the concave groove and protrusion. This eliminates the needs for securing the permanent magnet and driving arm by an adhesive, for performing insert molding of them, and further allows a reliable connection between the permanent magnet and driving arm to be maintained.

The paired upper and lower rotor supporting members each comprise a frame substrate, e.g., a bottom board included in a light quantity-control device, and the permanent magnet and driving arm are mounted on the frame substrate. Such arrangement makes it possible, for example, to incorporate a magnet rotor a light quantity-control device into a first form. Further, a core member is provided on the lower end face on the hollow cylindrical permanent magnet, in which the core member is fitted in a hollow space portion of the permanent magnet in a direction of the rotary shaft.

The core member and the frame substrate supporting the permanent magnet or driving arm constitute a pair of upper and lower rotor supporting members. Third fitting parts having a form substantially identical to the form of the first fitting parts formed in the permanent magnet are provided in the core member. Then, second fitting parts formed in the driving arm are fitted to the first fitting part of the permanent magnet and the third fitting part of the core member respectively. Thus, the driving arm is coupled with the permanent magnet and concurrently coupled with the core member fitted in the permanent magnet, and therefore more reliable securing can be achieved.

The invention makes it possible to arrange an electromagnetically-driving device including: a hollow cylindrical permanent magnet having an internal circumferential face and an external circumferential face; a rotary shaft forming a rotation center of the permanent magnet; a driving arm rotating integrally with the permanent magnet; an inside yoke disposed on a side of the internal circumferential face of the permanent magnet; an outside yoke disposed on a side of the external circumferential face of the permanent magnet; and an excitation coil generating a magnetic field in the inside and outside yokes. In addition, the outside yoke includes a pair of magnetic pole-guide pieces, which are opposed to each other along and outside the external circumference of the permanent magnet. The inside yoke includes a core member fitted and disposed to the hollow-side internal circumferential face of the permanent magnet into one.

In such configuration, first fitting parts each composed of a protrusion or concave groove are formed in the upper end face of the permanent magnet in a direction of the rotary shaft, second fitting parts each composed of a protrusion or concave groove and mating with the corresponding first fitting part are formed in the driving arm, and third fitting parts having a form substantially identical to the form of the first fitting parts are formed in the core member.

Thus, the permanent magnet is supported between a pair of upper and lower rotor supporting members, such as a device frame, through the rotary shaft. In this case, the depths of fitting between the first and second fitting parts and between the first and third fitting parts are set so that the length of a combination of the permanent magnet, driving arm and core member is longer than the supporting distance between the paired upper and lower rotor supporting members. This allows the permanent magnet and driving arm to be kept in the condition where they are reliably fitted to each other through the fitting parts after they are supported between the paired rotor supporting members.

DETAILED DESCRIPTION OF PREFERRED EMBODIMENTS

Figure 14:
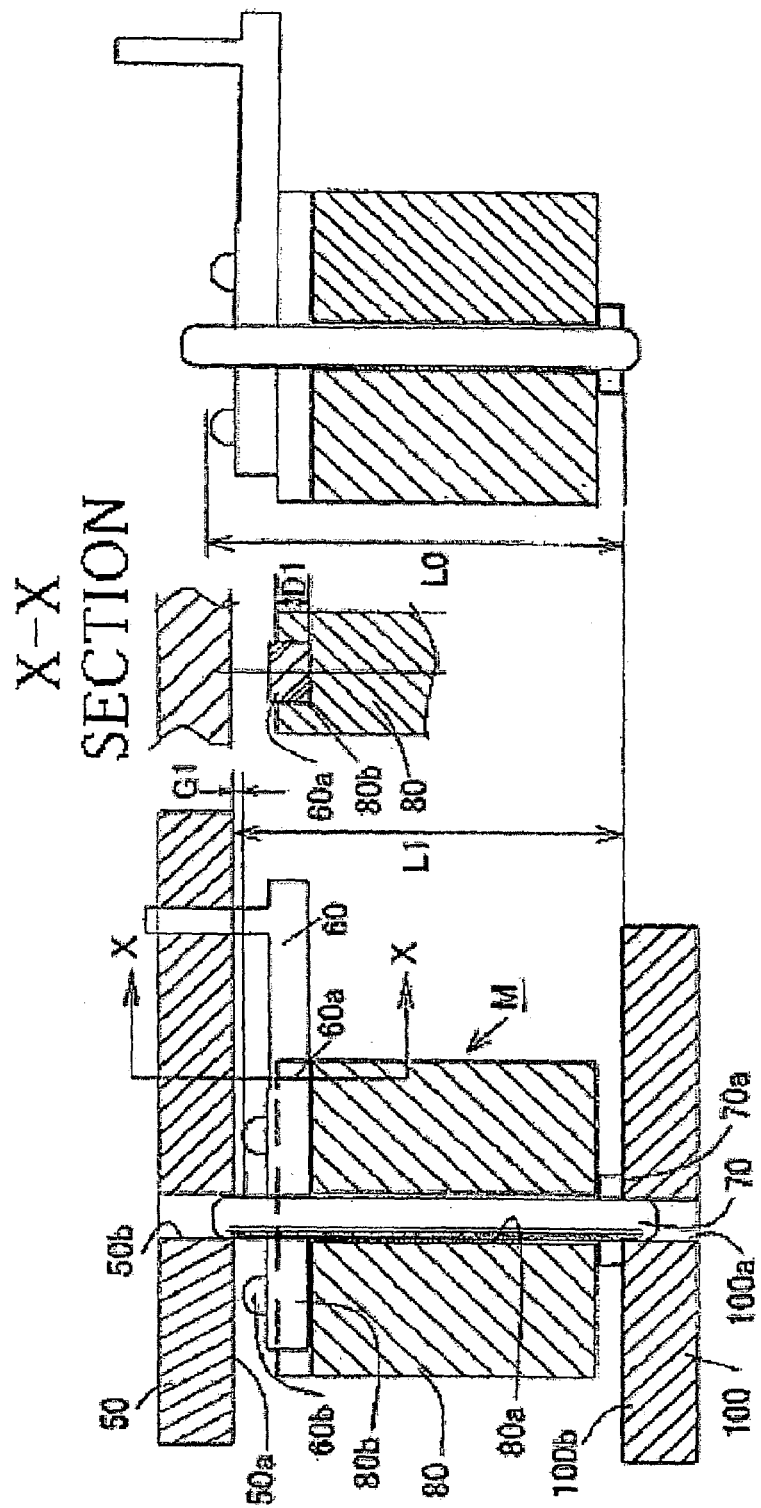
FIG. 14A is one embodiment of a structure of a magnet rotor in association with the invention.
FIG. 14B is another embodiment of a structure of a magnet rotor in association with the invention.
Figure 14:
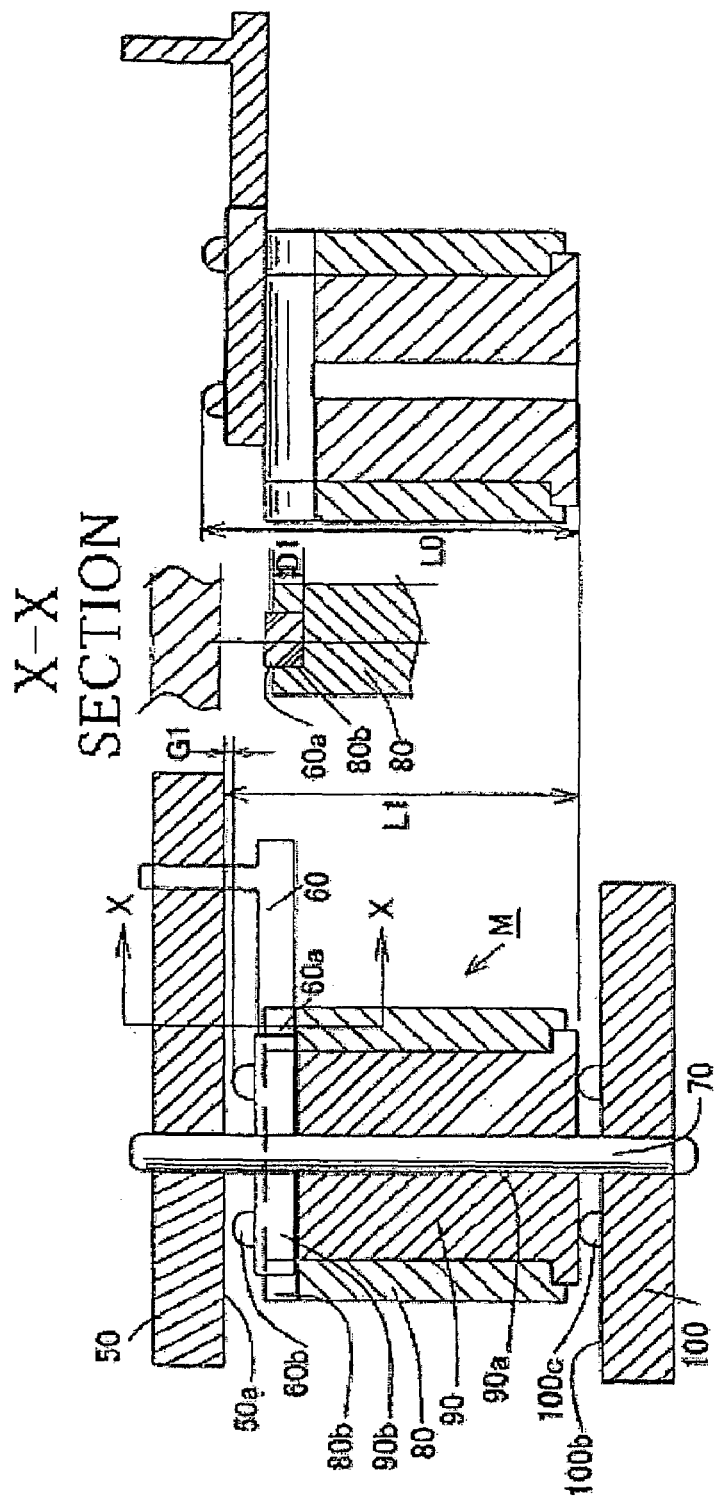

The exemplary embodiments of FIGS. 14A and 14B include a supporting structure of a magnet rotor in association with the invention. First, a theory of the supporting structure of the magnet rotor in association with the invention will be described with reference to FIG. 14A. The magnet rotor includes: a pair of upper and lower rotor supporting members 50, 100; a permanent magnet 80; a rotary shaft 70; and a driving arm 60. The permanent magnet 80, rotary shaft 70 and driving arm 60 are assembled into a rotor assembly M. In FIG. 14A, the permanent magnet 80 is configured so as to have a hollow, cylindrical shape. In the center of the permanent magnet, a shaft bore 80a is provided in which the rotary shaft 70 is fitted.

Figure 7:
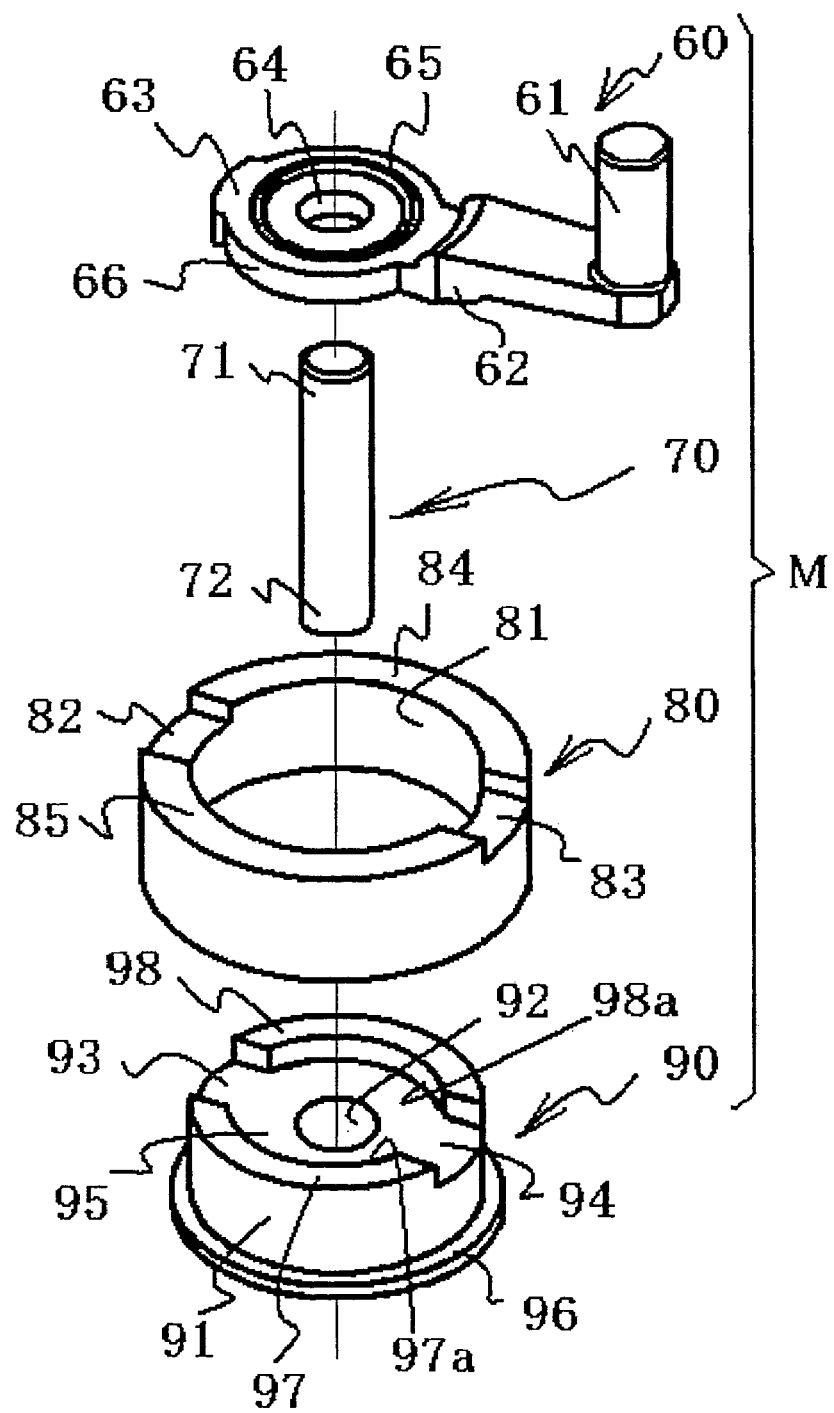
FIG. 7 is an exploded perspective view of FIG. 6.
Figure 8:
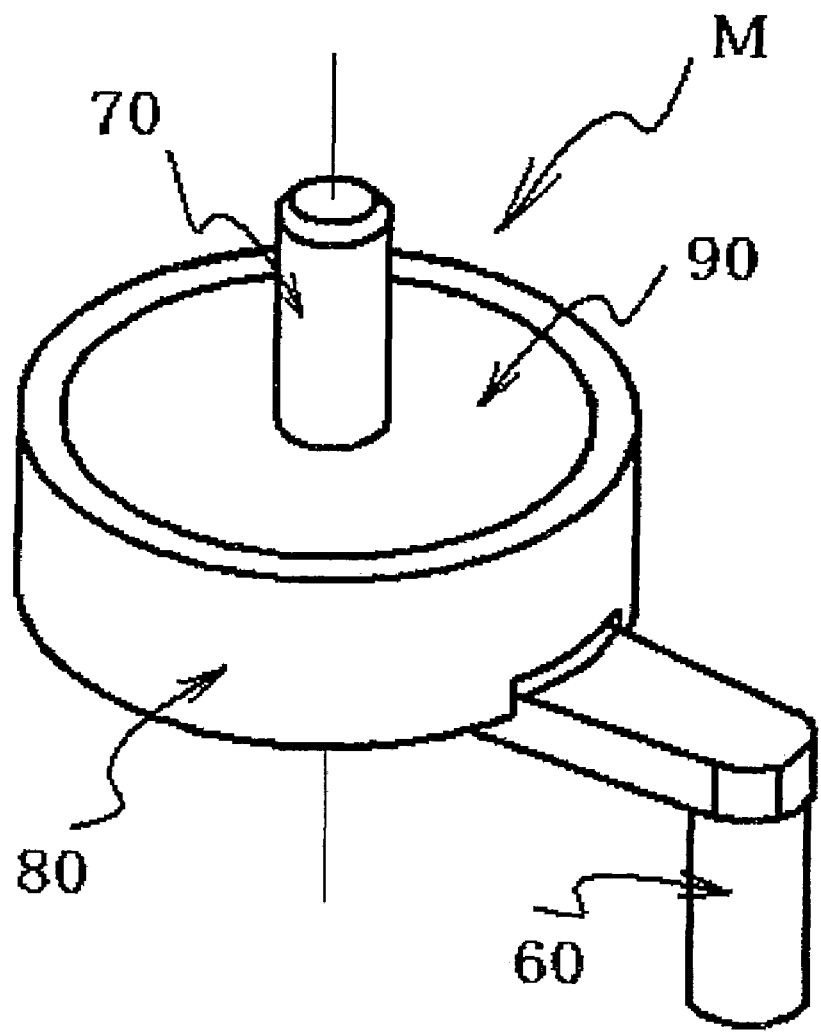
FIG. 8 is an external view of the magnet rotor in association with the electromagnetically-driving device, when it is viewed from the side of a core of the rotor.

A base end portion of the driving arm 60 is fitted in the rotary shaft 70 by the following method. A first fitting part 80b composed of slotted concave parts (82 and 83 in FIG. 7), is formed in an upper end face of the permanent magnet 80. In the driving arm 60, a second fitting part 60a, comprises a convex part that mates with the concave part. Portion 60a in the drawing shows the contour of the arm, and corresponds to a portion indicated by the numeral 62 in FIG. 7. Further, the rotary shaft 70 has a flange part 70a provided on a lower end portion in its axial direction. Then, the rotary shaft 70 is inserted in a hollow space portion inside the permanent magnet and made to pierce the magnet. The driving arm 60 is made to pierce an upper portion of the rotary shaft, such that the upper end face of the permanent magnet is capped with the driving arm 60.

The rotor assembly M is thus constructed, and the assembly M is supported between the paired upper and lower rotor supporting members 50, 100. The upper supporting member 50 is provided with a bearing bore 50a and a supporting face 50a for supporting the driving arm 60 or the upper end face of the permanent magnet. Likewise, the lower supporting member 100 is provided with a bearing bore 100a and a supporting face 100b for supporting the flange part 70a of the rotary shaft 70. The lower end portion of the rotary shaft 70 is fit in the bearing bore 100a so that it can rotate freely and the flange part 70a is supported by the supporting face 100b.

An upper end portion of the rotary shaft 70 is fit in the bearing bore 50b of the upper supporting member 50. In the magnet rotor shown in the drawing, a rib 60b formed in the driving arm 60 is supported by the supporting face 50a. In this case, a small clearance, namely a gap G1, is provided between the rib 60b and supporting face 50a so that the rotor assembly M can rotate around the rotary shaft 70. The gap G1 measures approximately 50-100 μm and provides a small amount of play in the direction of the rotary shaft in order to minimize friction with the supporting face 50a when the driving arm 60 is rotated.

The first fitting part 80a formed in the permanent magnet 80 and the second fitting part 60a formed in the driving arm 60 engage with each other, and in this condition they are supported between the upper and lower supporting members 50, 100. Thus, the permanent magnet 80 and driving arm 60 will rotate around the rotary shaft 70 in one integrated form. The engagement is arranged so that the length L0 of a combination of the permanent magnet 80 and driving arm 60 is longer than the length of the distance between the upper and lower supporting faces 50a and 100a, which is indicated by L1 in the drawing, such that the relation, L0>L1, is maintained. Such fitting is arranged by making the depth D1 of the fitting of the first fitting part with respect to the second fitting part a depth that builds the relation D1>G1.

The upper and lower supporting members 50, 100 depend on the device configuration. However, when an electromagnetically-driving device is configured as in the case of Patent Document 1 as described above, upper and lower ends of the rotary shaft 70 of the rotor assembly M, for example, are turnably supported by a coil frame (not shown) divided into two parts, i.e., upper and lower parts. The upper-side coil frame part constitutes the upper supporting member 50, and the lower-side coil frame part constitutes the lower supporting member 100. In this case, the rib 60b, which has been described above, provides smooth rotation of the rotor, and may not be required to provide the rib, depending on the bearing structure.

In regard to the above-described magnet rotor, the permanent magnet 80 and rotary shaft 70 are integrated, the driving arm 60 is fitted to the permanent magnet thus obtained, and the upper and lower supporting members maintains the fitting relation of the permanent magnet and driving arm. In addition, the magnet rotor in association with the invention may have the structure in which a sleeve-like core member 90 is fitted and disposed in the hollow space portion of the permanent magnet 80. The rotary shaft 70 is passed through the center shaft bore 90a of the core member 90 and secured to the upper and lower supporting members. In this case, the rotary shaft is secured to the supporting members so that it cannot rotate, as shown in FIG. 14B.

FIG. 14B illustrates a sleeve-like core member 90 fitted in a hollow space portion of the hollow cylindrical permanent magnet 80. As in the above-described device, the lower end face of the core member 90 is supported on and by the supporting face 100a of the lower supporting member 100. In addition, the supporting face 100a is provided with a rib 100c, which supports the core member 90 rotatably. Further, a first engaging part 80*b* composed of a concave groove is formed in the upper end face of the permanent magnet 80.

In the driving arm 60, a second engaging part 60*a*, which mates with the first engaging part 80*b*, is provided. Also, the core member 90 is provided with a third engaging part 90*b* having a shape substantially the same as that of the first engaging part 80*b*.

Hence, the core member 90 is fitted in the permanent magnet 80 to integrate them into a combination form, and the driving arm 60 is combined with the combination so as to be placed on the upper end face thereof like a cap. Then, the three parts are integrated by the rotary shaft 70. The rotary shaft 70 has an upper end portion secured by the upper supporting member 50 and a lower end portion secured by the lower supporting member 100. The upper supporting member 50 is provided with a supporting face 50*a* to engage with a rib 60*b* formed on the driving arm 60. The lower supporting member 100 has a rib 100*c* provided on its supporting face 100*b*, which engages with and supports the lower end face of the core member 90.

In such structure, a small clearance, namely a gap G1 is provided between the rib 60*b* and supporting face 50*a* so that the rotor assembly M can rotate around the rotary shaft 70. The gap G1 is formed as in the case of the rotor assembly, which has been described with reference to FIG. 14A. The first fitting part 80*a* formed in the permanent magnet 80, the second fitting part 60*a* formed in the driving arm 60 and the third fitting part formed in the core member 90 engage with each other, and in this condition, they are supported between the upper and lower supporting members 50, 100. Thus, the permanent magnet 80, core member 90 and driving arm 60 will rotate around the rotary shaft secured to the supporting members in one integrated form. The engagement is arranged so that the length L0 of a combination of the permanent magnet 80 and driving arm 60 is longer than the length of the distance between the upper and lower supporting faces 50*a* and 100*a*, which is indicated by L1 in the drawing, maintaining the relation L0>L1. Such fitting is arranged by making the depth D1 of the fitting of the first fitting part with respect to the second fitting part a depth, based upon the relation D1>G1. As for the configuration of the electromagnetically-driving device with a rotor assembly M as disclosed above, an example thereof is described below.

According to the configurations shown in FIGS. 14A and 14B, the permanent magnet 80, rotary shaft 70, driving arm 60 and core member 90 are molded individually, incorporated between and supported by the upper and lower supporting members 50, 100. The upper and lower supporting members 50, 100 are spaced away from each other by a predetermined distance, whereby the assemblies are integrated into a rotor assembly M. Particularly, the permanent magnet and driving arm are completely integrated when they rotates around the rotary shaft 70.

Figure 1:
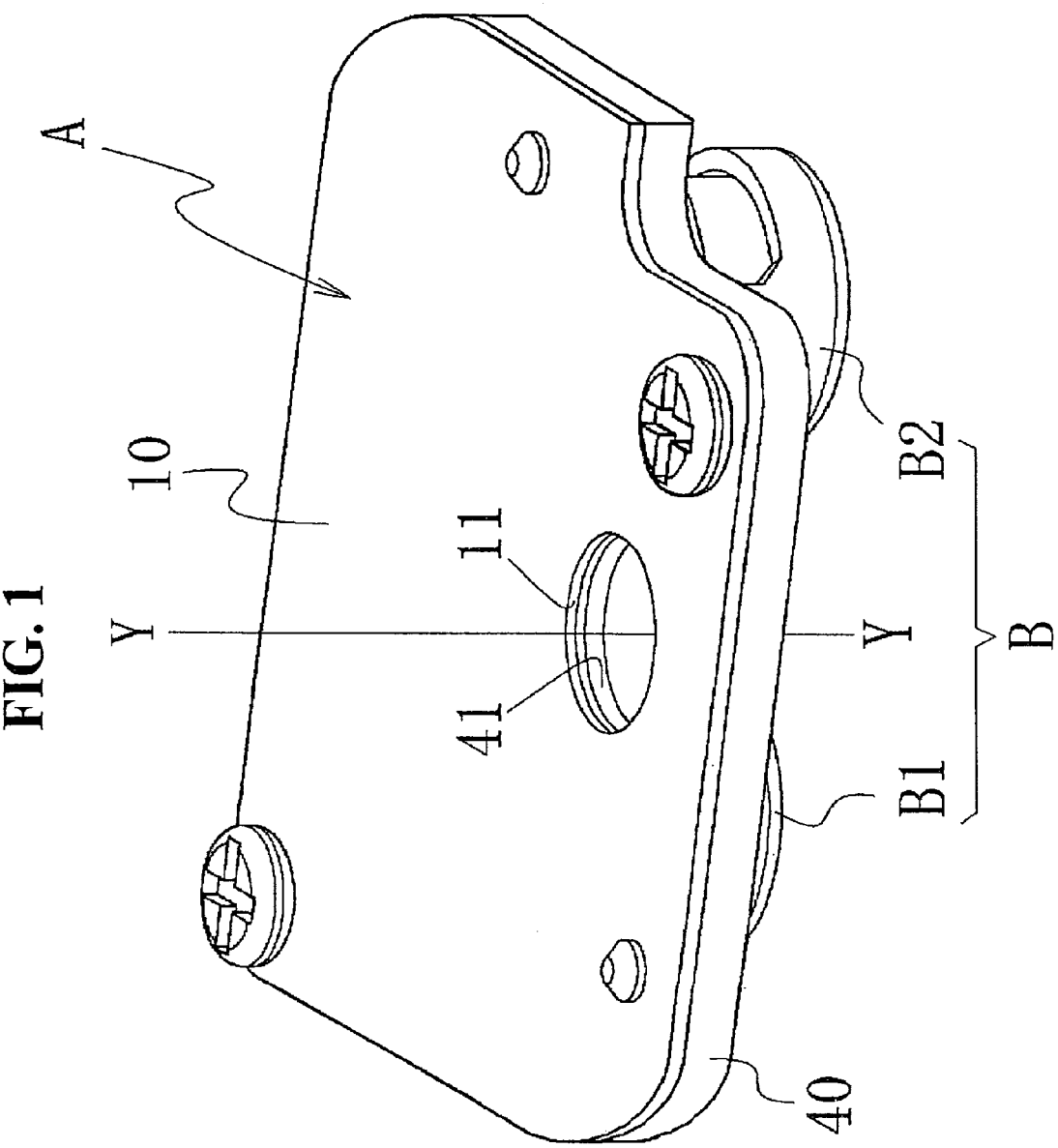
FIG. 1 is a perspective view of a light quantity-control device viewed from a side of a light-quantity regulating part.
Figure 2:
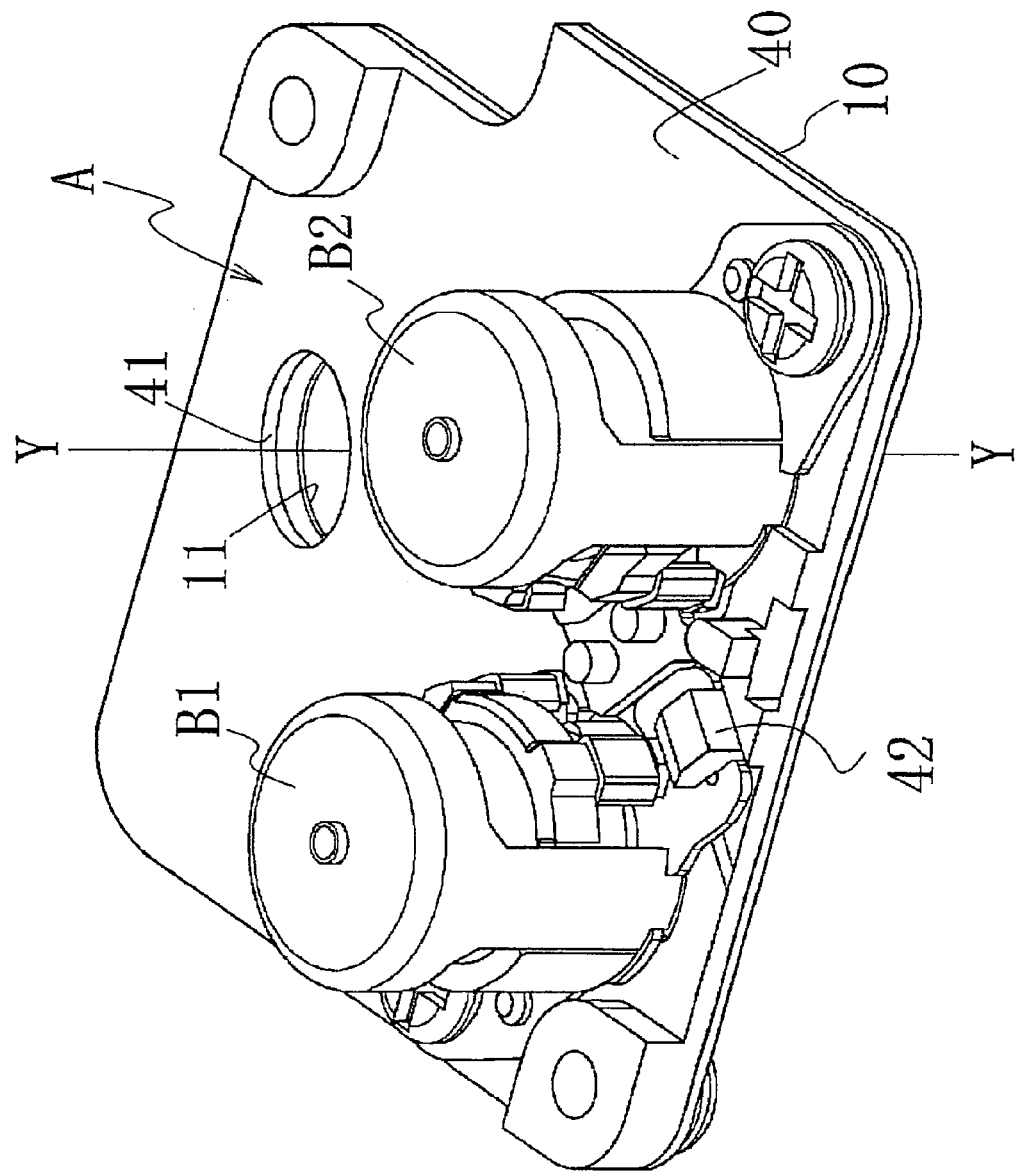
FIG. 2 is a perspective view of the light quantity-control device viewed from a side on which an electromagnetically-driving device is fixed.
Figure 3:
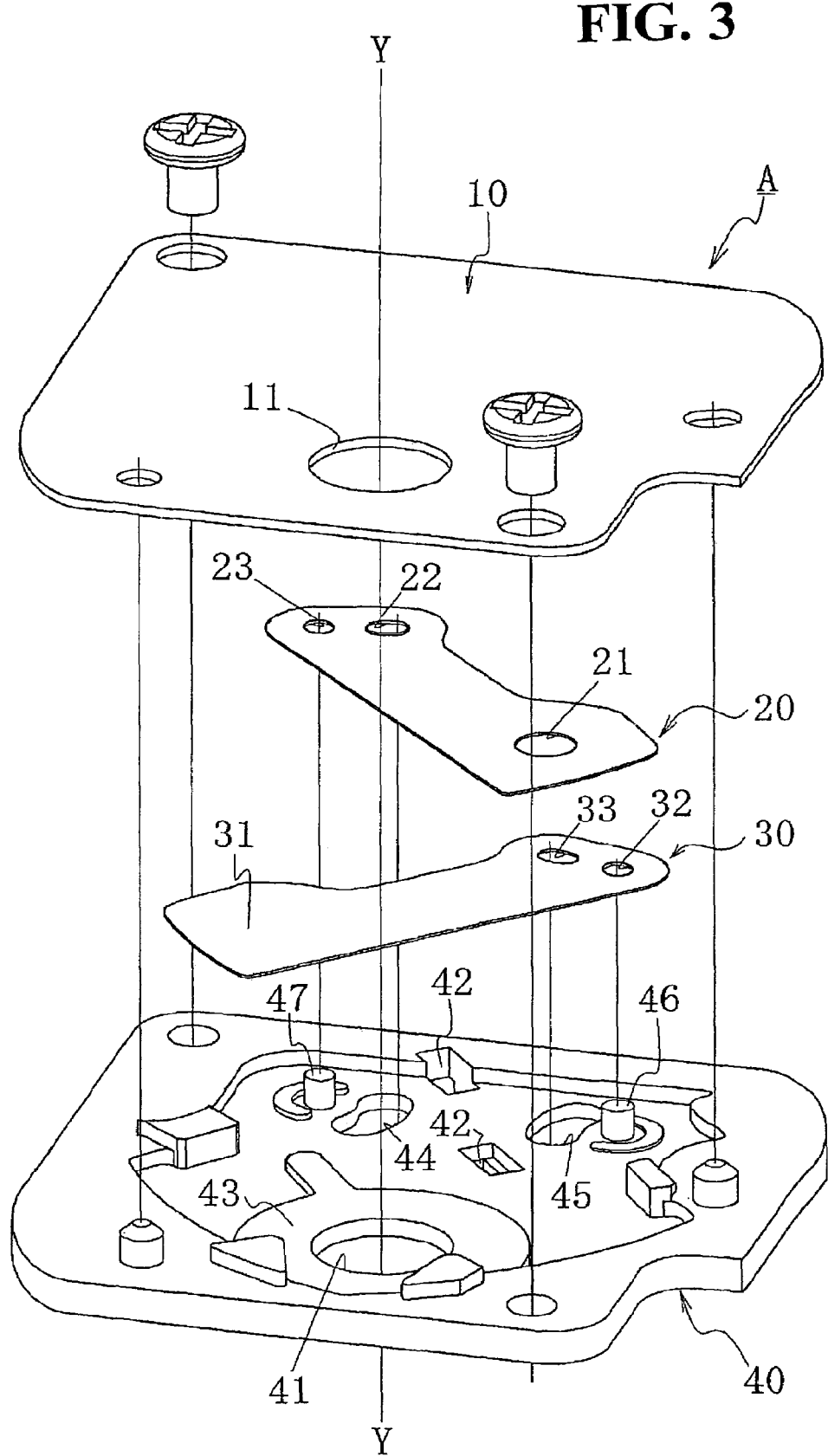
FIG. 3 is an exploded perspective view of the light-quantity regulating part in FIG. 1.
Figure 4:
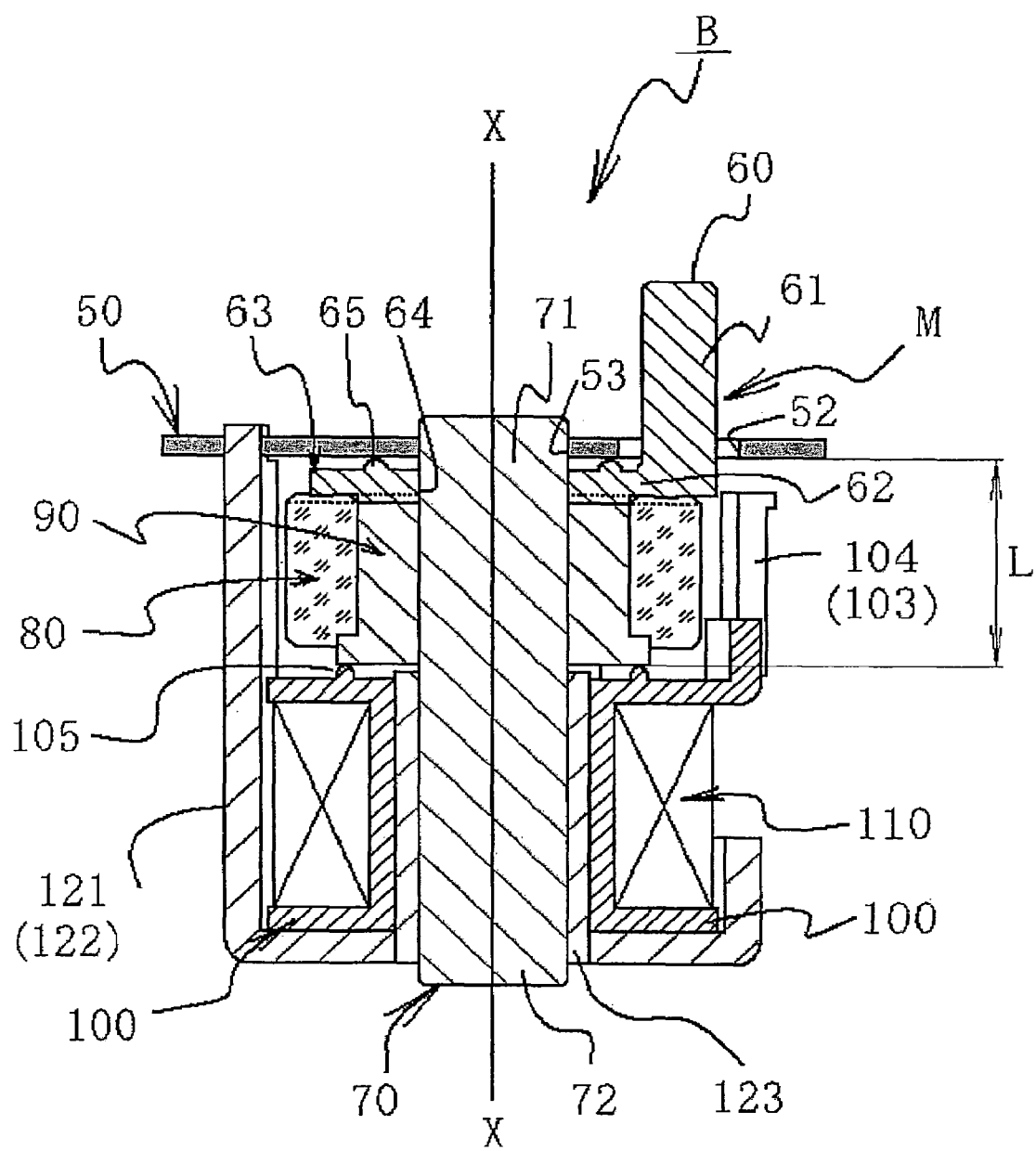
FIG. 4 is a longitudinal sectional view illustrating the inside structure of the electromagnetically-driving device in FIG. 2.

Now, with reference to FIGS. 1 to 12, the invention will be described in detail focusing on an electromagnetically-driving device and a light quantity-control device incorporating the above-described rotor assembly M. FIG. 1 is a perspective view of the light quantity-control device. FIG. 2 is a rear surface side perspective view of the light quantity-control device. FIG. 3 is an exploded perspective view thereof. FIG. 4 is a longitudinal sectional view of the electromagnetically-driving device after completion of the assembly.

The light quantity-control device illustrated in the drawings includes: a light-quantity regulating part A placed in an image-pickup barrel included in various camera devices; and an electromagnetically-driving device B for driving a blade member, e.g., a light-limiting blade 20 and a shutter blade 30, of the light-quantity regulating part A, operable to open and close the blades. Electromagnetically-driving device B may further include an electromagnetically-driving device B1 for driving a light-limiting blade and an electromagnetically-driving device B2 for driving a shutter blade.

As shown in FIG. 3, the light-quantity regulating part A includes: a base 40 placed in a barrel of a camera device; a light-limiting blade 20 and a shutter blade 30, which are assembled in the base 40; and a retaining plate 10 for holding the light-limiting blade 20 and shutter blade 30 in the base 40.

The base 40 is molded out of a resin or formed from a metal plate made of a nonmagnetic material such as aluminum in an appropriate shape. The base 40 has an optical-axis aperture 41, the center of which coincides with an image-pickup optical axis. The base 40 is assembled in the lens barrel of the camera device so that it is orthogonal to the shooting optical axis. The center of the optical-axis aperture 41 is coincident with the shooting optical axis. Further, the base 40 is integrally formed with a fixing part 42 (FIG. 3), to which the later-described electromagnetically-driving device B is to be fixed, and a guide rib 43 for guiding the light-limiting blade 20 and shutter blade 30. Therefore, the light-limiting blade 20 and shutter blade 30 are mounted on the surface side of the base 40, and the electromagnetically-driving device B is fixed on the rear surface side thereof.

The retaining plate 10 serves to hold the light-limiting blade 20 and shutter blade 30 so that they are rotatable with regards to the base 40 as described above, and has an optical path aperture 11 formed therein. The optical path aperture 11 is for deciding an open diameter of the optical system, which is similar in shape to, but a bit smaller than the optical-axis aperture 41 of the base 40, with its center coincident with the image-pickup optical axis. In addition, the light-limiting blade 20 is composed of one or more blade members for the purpose of restricting the aperture diameter of the optical path aperture 11 of the retaining plate 10 to a large or small size.

The illustrated light-limiting blade 20 comprises one blade member, which is intended for the case where the aperture diameter of the shooting optical axis can be controlled to tow steps, i.e. a full-open state and a partly-open state. The light-limiting blade 20 is formed by stamping a film-shaped plate material of a black pigment-impregnated polyester resin, in which a driving pin-coupling hole 22 for fitting the partly-open aperture 21 to a later-described transmission member, and a pivot axis hole 23 to be fitted to a blade-supporting shaft (described later) are formed.

Thus, the partly-open aperture 21, having a smaller diameter than the aperture diameter of the optical path aperture 11 of the retaining plate 10, is formed in the light-limiting blade 20.

The light-limiting blade 20 is pivotably mounted around the pivot axis hole 23 on the base 40. The light-limiting blade 20 can be made to open and close when the long and narrow hole (driving pin-coupling hole 22), into which the driving pin 61 of the later-described electromagnetically-driving device B1 is fitted, is displaced by the driving pin 61. Therefore, the light-limiting blade 20 pivots around the pivot axis hole 23.

When the light-limiting blade 20 is positioned so that its aperture overlaps the optical-axis aperture 41 of the base 40, the light quantity is restricted in the condition where the aperture diameter of the optical path aperture 11 of the retaining plate 10 is narrowed by the partly-open aperture 21 of the light-limiting blade 20. Consequently, the optical path aperture 11 is brought into the partly-open state. On the contrary, when the light-limiting blade 20 is in a location (posture) where it has retreated from the optical-axis aperture 41, the light quantity is restricted by the diameter of the optical path aperture 11 of the retaining plate 10 (full-open state).

The above-described light-limiting blade 20 is composed of one blade as shown in the drawing. However, it may be composed of two or more blades so that large, middle, or small-sized aperture diameters can be formed when the blades are made to selectively reach the optical-axis aperture 41. Alternatively, it may be arranged so that the optical-axis aperture 41 is continuously made larger or smaller and controlled by gradually opening or closing the two or more blades with respect to the optical-axis aperture 41. In the former case where the two or more blades are selectively made to reach the optical-axis aperture 41, the light-limiting blade 20 is arranged so that the two or more blades are superposed on the base 40 and pivotably mounted on the base with a pin or the like, and a later-described driving device is selectively connected to the two or more blades by e.g. a cam mechanism.

In the latter case where the light quantity is continuously controlled by the two or more blades which have reached the optical-axis aperture 41, the two or more blades are arranged so that the optical-axis aperture 41 is covered by the outer edge portions of the blades, and the light quantity can be arbitrarily controlled within a range from a large diameter to a small diameter by concurrently moving the blades with the driving device.

The shutter blade 30 has a masking region 31 formed therein, and the masking region has enough area to cover the aperture diameter of the optical path aperture 11 of the retaining plate 10. The shutter blade 30 is pivotably mounted around the pivot axis hole 32 on the base 40. The shutter blade 30 can be made to open and close when the long and narrow hole 33, into which the driving pin 61 of the later-described electromagnetically-driving device B2 is fitted, is displaced by the driving pin 61. Therefore, the shutter blade 30 pivots around the pivot axis hole 32.

When the shutter blade 30 is positioned so that its aperture overlaps the optical-axis aperture 41 of the base 40, the masking region 31 of the shutter blade 30 brings the optical path aperture 11 of the retaining plate 10 into a closing state. Alternatively, when the shutter blade 30 is in a location (posture) where it has retreated from the optical-axis aperture 41, the optical path aperture 11 of the retaining plate 10 is brought into the full-open state. While the above-described shutter blade 30 is composed of one blade as shown in the drawing, it may be composed of two or more blades.

Electromagnetically-Driving Device and Magnet Rotor

Figure 5:
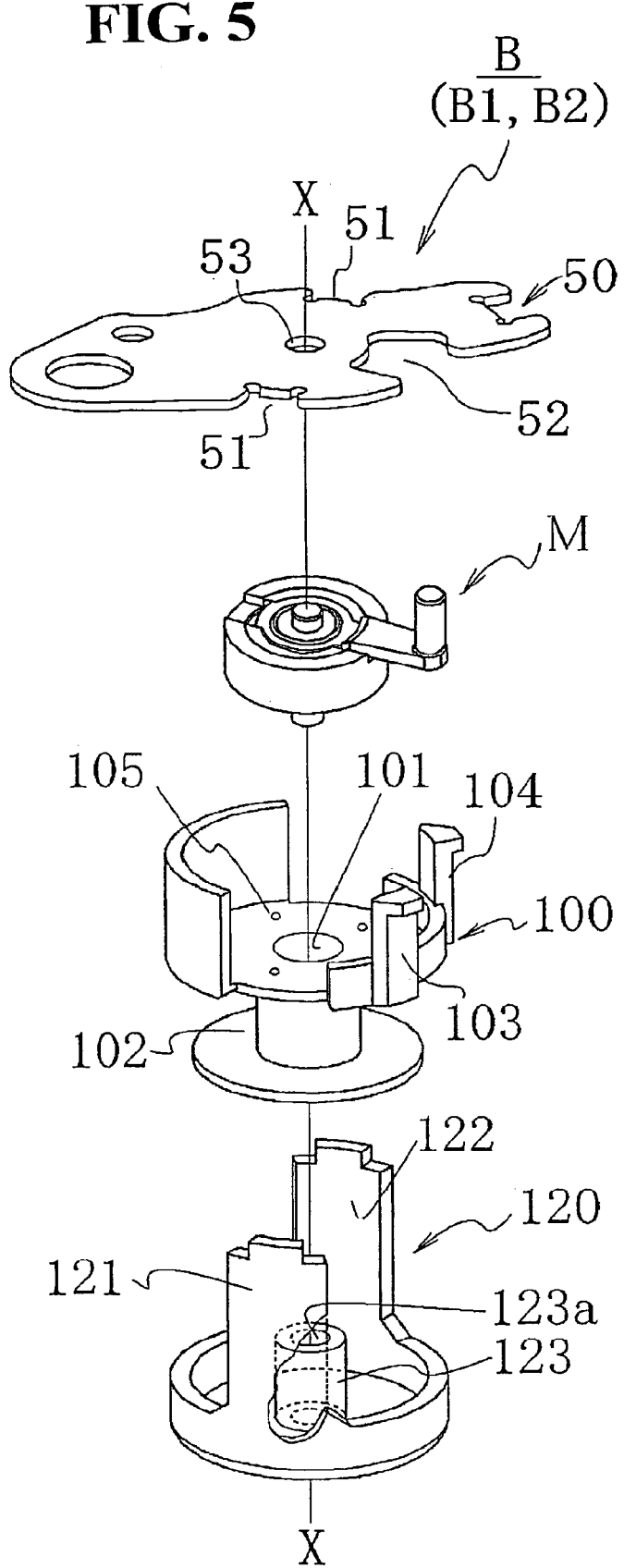
FIG. 5 is an exploded perspective view of the electromagnetically-driving device in FIG. 4.
Figure 6:
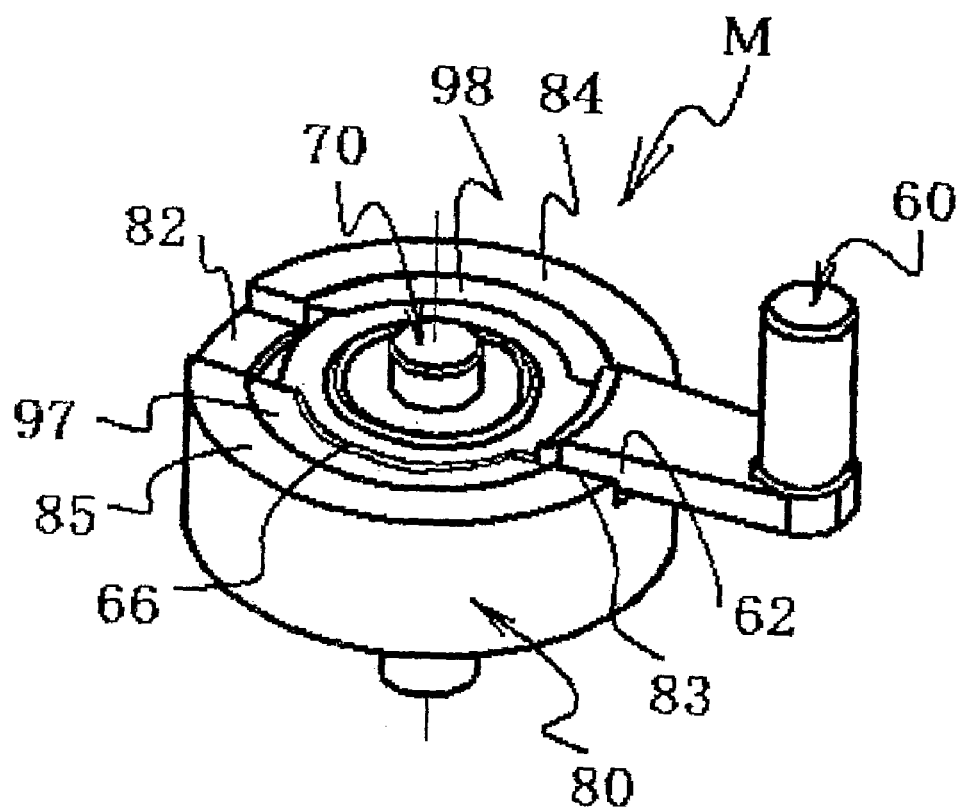
FIG. 6 is an external view of a magnet rotor comprising the electromagnetically-driving device, when it is viewed from the side of the driving arm.

Next, the electromagnetically-driving device B will be described with reference to FIGS. 4 and 5, and the magnet rotor M will be described with reference to FIGS. 6 to 9. The electromagnetically-driving device B is composed of an electromagnetically-driving device B1 for driving a light-limiting blade and an electromagnetically-driving device B2 for driving a shutter blade.

As shown in FIG. 2, the two electromagnetically-driving devices are exactly the same, and are fixed on the base 40 so that they are opposed to each other. As shown in FIG. 4, the electromagnetically-driving device B (B1, B2) includes: a fixing member 50 for fixing the electromagnetically-driving device B on the base 40 of the above-described light-quantity regulating part A; a magnet rotor M composed of a permanent magnet 80 and a driving arm 60; an inside yoke 123 for rotatably journaling the magnet rotor M; an outside yoke 121 (122) for producing a magnetic field around the magnet rotor M; and an excitation coil 110 for magnetically exciting the inside yoke 123 and outside yoke 121 (122). The fixing member 50 constitutes the upper supporting member, and the coil frame 100 constitutes the lower supporting member, the fixing member and coil frame make a pair of upper and lower rotor supporting members.

Figure 9:
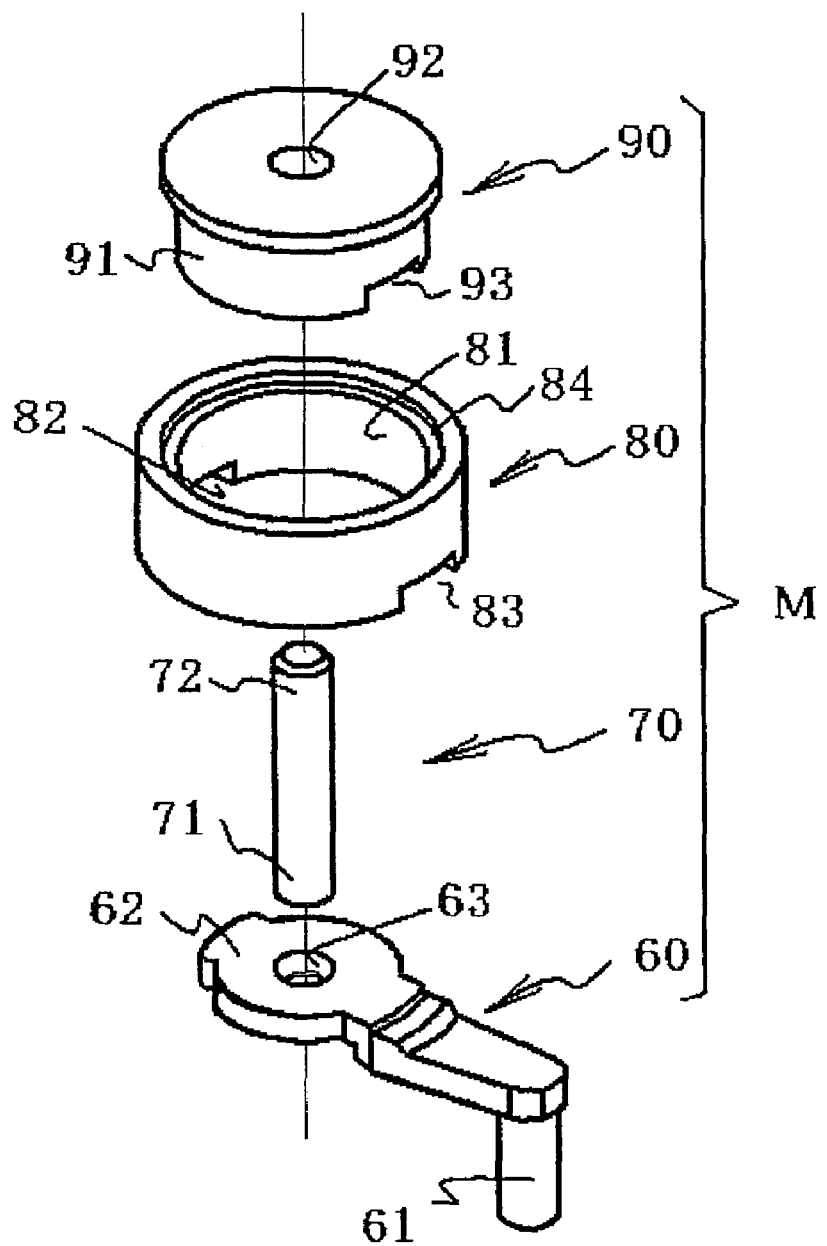
FIG. 9 is an exploded perspective view of FIG. 8.
Figure 10:
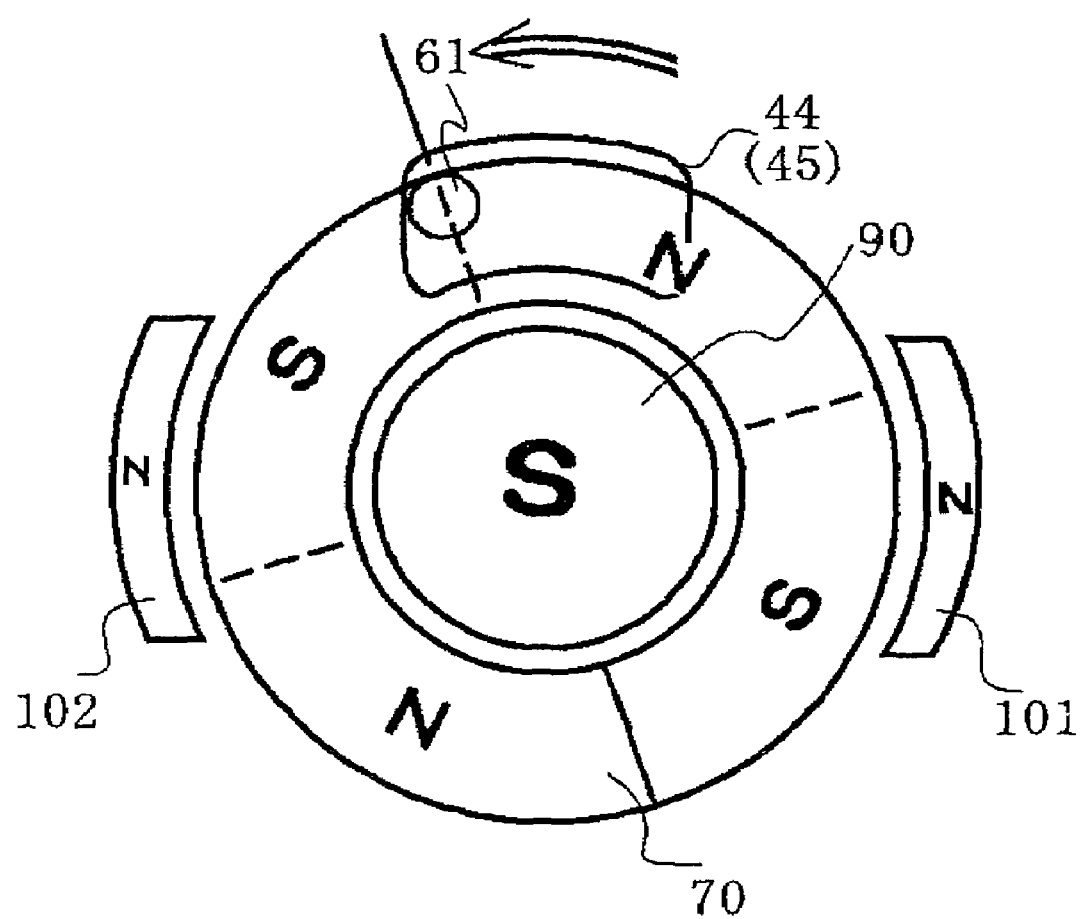
FIG. 10A illustrates a magnetized condition A of a magnet of the magnet rotor.
FIG. 10B illustrates a magnetized condition B of the magnet of the magnet rotor in association with the invention.
Figure 10:
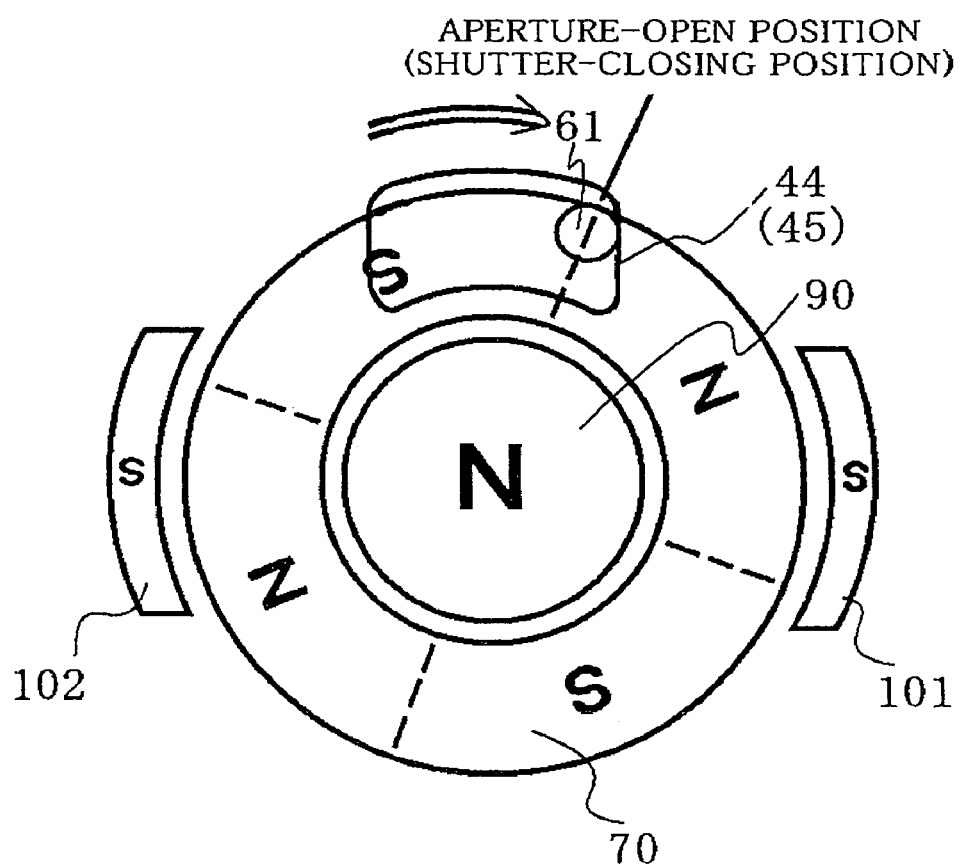

The permanent magnet 80 of the magnet rotor M is formed from a ferromagnetic material, e.g., a neodymium rare-earth plastic, into a hollow, cylindrical shape. The permanent magnet includes concave parts 82, 83 (first fitting parts) shown in FIG. 7, and a stepped circumferential part 84, as shown in FIG. 9. The permanent magnet 80 and driving arm 60 engage each other, wherein the concave parts 82, 83 of the permanent magnet 80 are fitted to a base end portion of an arm part 62 of the driving arm 60, which is made of a resin material such as polycarbonate and a flange part 62 for positioning (second fitting part).

Thus, permanent magnet 80 and driving arm 60 are positioned and coupled with each other. At the same time, the sleeve-like core member 90 is fitted to the hollow-side internal circumferential face 81 of the permanent magnet 80, and the collar part 96 formed on an upper end face thereof is fitted to the stepped circumferential part 84 so that their faces conform to each other. In the condition where the permanent magnet 80 is sandwiched between the driving arm 60 and core member 90, the rotary shaft 70 is press-fitted into the driving arm 60 and core member 90 and connected with them, whereby the magnet rotor M is assembled.

The structure of the permanent magnet 80 sandwiched by the driving arm 60 and core member 90 as described above is particularly intended to prevent the permanent magnet 80 from being damaged. According to such sandwich structure, the core member 90 is inserted inside the permanent magnet 80 upward in the drawing so that the hollow-side internal circumferential face 81 of the permanent magnet 80 is in sliding-contact with the external circumferential face 91 of the core member 90, to fit a rotational center external circumferential side face 66 of the driving arm 60 to internal circumferential faces 97a, 98a of peripheral protrusions 97, 98 of the core member 90. Concurrently the arm part 62 of the driving arm 60 is inserted into the concavity part 83 of the permanent magnet 80. Thus, the driving arm 60, permanent magnet 80 and core member 90 are respectively restricted in rotary motion.

In this condition, the rotary shaft 70 is fitted so as to run through the shaft bore 64 in the driving arm 60 and the shaft bore 92 in the core member 90. Thus, the magnet rotor M can be manufactured without using adhesion and insert molding.

Hence, when the core member 90 supports the hollow-side internal circumferential face 81 of the permanent magnet 80, it becomes possible to prevent the permanent magnet 80 from being damaged. Further, the peripheral protrusions 97, 98 of the core member 90 are opposed to the stepped circumferential parts 84, 85 forming the concave parts 82, 83 of the permanent magnet 80 in the same plane, whereby a magnetic circuit is formed there and the magnetic torque is increased accordingly.

Further, when the rotational center external circumferential side face 66 of the driving arm 60 is fitted to the internal circumferential faces 97a, 98a of the peripheral protrusions 97, 98 of the core member 90, a more reliable fitting may be achieved in comparison to fitting of the rotary shaft 70 to the shaft bore 64 of the driving arm 60.

The driving arm 60 includes a shaft bore 64 and a slide bearing part 65, the centers of which coincides with the center of the cylindrical permanent magnet 80. Further, the driving arm 60 includes a pin-like transmission member 61 (hereinafter referred to as driving pin) upright provided on a leading end portion of the arm part 62 so as to protrude outside the device, which is integrated with the driving arm by resin molding. In the magnet rotor M, the rotary shaft 70 supporting the hollow cylindrical permanent magnet 80 runs through a hollow space inside the inside yoke 123. Therefore, the magnet rotor M is rotatably supported using a hollow space-side internal circumferential face of the inside yoke 123 as a rotary circumferential face.

The inside yoke 123 and outside yoke 121 (122) are formed from a soft magnetic material, such as iron. The outside yoke 121 (122) has a trough form in section and has two magnetic pole-guide pieces 121, 122, which are opposite to each other. The inside yoke 123 has an end portion connected with a securing portion 123 (FIG. 5), which makes a bottom part of the outside yoke 121 (122) shaped into a trough form in section, by squeezing, welding or the like, whereby the inside and outside yokes are integrated.

In other words, the outside yoke 121 (122) is formed in a cylindrical shape so as to wrap the magnet rotor M formed in a cylindrical shape, to which the inside yoke 123 is secured at the center of its bottom wall. Also, the outside yoke 121 (122) includes two or more pectinated pieces so as to form magnetic poles opposite to the external circumference of the permanent magnet 80. The outside yoke shown in the drawing has a pair of such pectinated pieces provided at locations opposite to each other with the permanent magnet 80 disposed therebetween so that the pectinated pieces face N and S magnetic poles of the permanent magnet 80.

Thus, the inside yoke 123 and outside yoke 121 (122) are formed from a soft magnetic material such as a iron-based material so as to lead a magnetic field to the surrounding area of the permanent magnet 80 of the magnet rotor M. Further, the inside yoke 123 is secured to the outside yoke 121 (122) by squeezing or other securing means, whereby the inside and outside yokes are magnetically connected. In addition, the outside yoke 121 (122) supports the inside yoke 123, thereby to keep the strength of the yoke as a structure.

To the inside yoke 123, the excitation coil 110 is attached. In the case shown in the drawing, the excitation coil 110 is arranged as follows: a conducting wire is wound around the coil frame 100 formed from a resin material such as a liquid crystal polymer forming the excitation coil 110, and then the resultant excitation coil 110 is fitted to the inside yoke 123. Hence, when a current is conducted in the excitation coil 110, the magnetic field generated by the excitation coil 110 is led by the outside yoke 121 (122) and the inside yoke 123 so that it passes through the rotary shaft 70 and core member 90, which are formed from a soft magnetic material. As a result, magnetic poles opposite to each other are formed with the permanent magnet 80 disposed therebetween.

Incidentally, the coil frame 100 shown in the drawing is inserted in the inside yoke 123 having a shaft-like form, and the lower end portion of the inside yoke 123 is secured to the outside yoke 121 (122) by squeezing, welding, or other securing means. As a result, the coil frame 100 is to be fixed to the outside yoke 121 (122) in the condition where it is supported by the inside yoke 123.

The magnetic pole-guide pieces 121, 122 of the outside yoke 121 (122) are secured to the fixing member 50 as follows. The fixing member 50 is shaped by press working of a metal sheet material made of a nonmagnetic material. The fixing member 50 has yoke-fixing notch portions 51 formed therein. The leading end portions of the magnetic pole-guide pieces 121, 122 are fitted in the yoke-fixing notch portions 51, whereby the outside yoke are positioned. The fixing member 50 journals one end of the rotary shaft 70 of the magnet rotor M through the bore 53 in the central portion thereof.

The fixing member 50 is made of a nonmagnetic material to form a magnetic circuit by the inside yoke 123, outside yoke 121 (122) and permanent magnet 80 as described later with reference to FIG. 11. Hence, the outside yoke 121 (122) is secured to the fixing member 50, and the inside yoke 123 and coil frame 100 are secured to the outside yoke 121 (122). Therefore, magnet rotor M is journaled rotatably with respect to the inside yoke 123 between the fixing member 50 and coil frame 100.

Also, the rotor M has ribs 66 and 105 formed thereon. The ribs 65 are intended to reduce sliding friction during rotation for smooth rotation, and located in a plane portion on an abutting face opposed to the fixing member 50 and protrudes along a direction of the center core of the shaft lying at the center of the magnet rotor. Rib 105 is provided on the coil frame and abuts against the core member 90 of the magnet rotor M. While the ribs 64 and 105 are formed as protrusions at three locations, the ribs may form a guide protruding in a doughnut-like form.

Also, the coil frame 100 has, in addition to a frame body part 122 around which the excitation coil 110 is to be wound, lead-termination arms 123 and 104 (FIG. 5) integrally molded by resin molding. Around the lead-termination arms 123 and 104, lead end portions as winding start and end portions of the excitation coil 110 are wound and entwined.

In the condition where the magnet rotor M is incorporated in the electromagnetically-driving device as shown in FIG. 4, the distance L between a planar end face of the fixing member 50 and the top of the rib 105 of the coil frame 100 is set to a size such that the relation of engagement between the concave parts 82, 83 of the permanent magnet 80 and the arm part 62 of the driving arm 60 and the flange part 63 is never impaired and thrust play is created in an axial direction of the rotary shaft 70 of the magnet rotor M.

Therefore, even when the connection of the driving arm 60 and core member 90 by the rotary shaft 70 loosens, the relation of engagement between the concavity parts 82, 83 of the permanent magnet 80 and the arm part 62 of the driving arm 60 and the flange part 63 is kept, and thus the relation of the location of a pole of the permanent magnet 80 with respect to the driving pin 61 of the driving arm 60 is never broken. Since the sandwich structure in which the permanent magnet 80 is sandwiched by the driving arm 60 and core member is kept, the rotation force of the permanent magnet 80 causes no operation failure.

Magnetic Circuit

The magnetic circuit, including the yokes and rotor is described with reference to FIGS. 10A, 10B and 11. In the magnet rotor M, the external circumference portions of the hollow, cylindrical permanent magnet 80 are magnetized so as to have four N-S magnetic poles, as shown in FIGS. 10A and 10B. The inside yoke 123 and outside yoke 121 (122) are disposed so as to be opposite to each other with the permanent magnet 80 placed therebetween. The inside yoke 123 is arranged so that a magnetic pole is formed in a central hollow space portion of the permanent magnet 80 through the core member 90. The outside yoke 121 (122) is arranged so that two magnetic pole-guide pieces 121, 122 form magnetic poles in mutually opposed locations outside the external circumferential face of the permanent magnet 80. Also, the inside yoke 123 and outside yoke 121 (122) lead a magnetic force generated by the excitation coil 110 to form magnetic poles in locations, which are opposed to each other with the permanent magnet 80 interposed therebetween.

As shown in FIG. 10A, when an electric current in one direction is supplied to the excitation coil 110, N poles are formed on the two magnetic pole-guide pieces 121 and 122 of the outside yoke 121 (122), and an S pole is formed on the inside yoke 123 (core member 90), whereby the magnet rotor M is forced to rotate counterclockwise in the drawing. Conversely, as shown in FIG. 10B, when an electric current in the reverse direction is supplied to the excitation coil 110, S poles are formed on the two magnetic pole-guide pieces 121, 122 of the outside yoke 121 (122), and an N pole is formed on the inside yoke 123, whereby the magnet rotor M is forced to rotate clockwise in the drawing.

The driving pin 61 for transmitting the rotation to the outside is formed integrally with the magnetic rotor M. The driving pin 61 extends through the notch portion 52 of the fixing member 50 and runs through the long and narrow hole (slit) 44 or 45 of the base 40, and is fitted in the long and narrow hole 22 or 23, which is a driving pin-coupling hole of the light-limiting blade 20 or shutter blade 30.

Hence, supplying an electric current in one direction to the excitation coil 110 forces the magnet rotor M to rotate clockwise, and supplying an electric current in the reverse direction to the excitation coil forces the magnet rotor M to rotate counterclockwise, and therefore the forward and reverse rotations of the magnet rotor M are transmitted to the light-limiting blade 20 and the shutter blade 30 by the driving pin 61. As a result, the light-limiting blade 20 and the shutter blade 30 are pivoted around the blade-supporting shafts 23 and 32 clockwise and counterclockwise, respectively.

In the condition shown in FIG. 10A, the light-limiting blade 20 is located so that its aperture overlaps the optical-axis aperture 41 and as such, the partly-open aperture 21 restricts the light quantity (partly-open state). In the condition shown in FIG. 10B, the light-limiting blade 20 is moved to a location where it has retreated from the optical-axis aperture 41, and as such, the optical-axis aperture 41 restricts the light quantity (Full-open state). On the other hand, the shutter blade 30 is located over the optical-axis aperture 41 and opens the optical aperture 11 of the retaining plate 10 in the condition shown in FIG. 10A. Further, in the condition shown in FIG. 10B, the shutter blade 30 is moved to a location where it has retreated from the optical-axis aperture 41 and closes the optical aperture 11 of the retaining plate 10.

The long and narrow hole (slit) 44 or 45 formed in the base 40 is disposed in locations such that a motion-restricting region to reciprocate the magnet rotor M in forward and reverse directions within a predetermined angle is formed, as shown in FIGS. 10A and 10B. Therefore, the magnet rotor M swings by a predetermined angle within a range between end faces of the long and narrow hole (slit) 44 or 45 formed in the base 40. Thus, the driving pin 61 drives the light-limiting blade 20 to open and close between Full-open position and Partly-open position, and drives shutter blade 30 to open and close it between the Open position and the Close position.

The light-limiting blade 20 needs to be stopped in Full-open position (the state shown in FIG. 10B) and Partly-open position (the state shown in FIG. 10A). For the purpose of this, the following methods have been known, and any of them can be adopted. The first method conducts a feeble electric current through the excitation coil 110 thereby holding the light-limiting blade 20 in the above mentioned positions. The second method restricts the position of the light-limiting blade 20 by applying an electric current to the excitation coil 110 in the condition where the blade 20 is urged by a close spring in one direction. The third method provides an iron piece, for example, which magnetically attracts the blade 20, in the area surrounding the blade.

Figure 11:
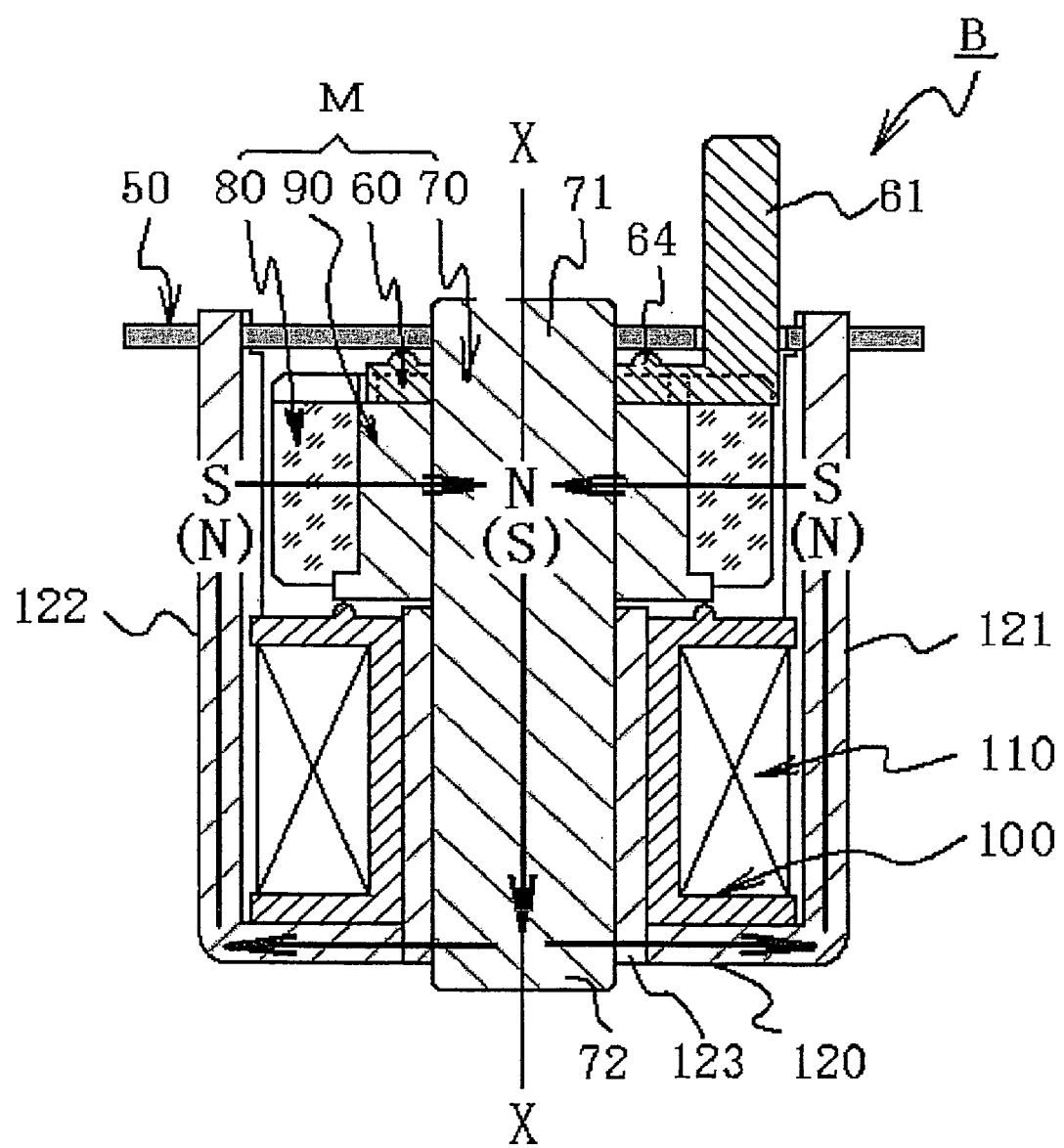
FIG. 11 is a magnetic circuit of an electromagnetically-driving device in association with the invention.

When the excitation coil 110 shown in FIG. 11 is supplied with an electric current, the outside yoke 121 (122) and the inside yoke 123 are magnetized by a magnetic field generated by the coil. At this time, the inside yoke 123 and the outside yoke 121 (122) are magnetically connected through one of their ends, and the other ends are opposed to each other through the permanent magnet 80 of the magnet rotor M. Therefore, S pole develops on the inside yoke 123 when N pole develops on the outside yoke 121 (122), and N pole develops on the inside yoke 123 when S pole develops on the outside yoke 121 (122). In other words, the outside yoke 121 (122) and the inside yoke 123 have one set of ends mutually secured by squeezing or welding and are magnetically connected to each other through the one ends. Magnetic poles (N-S poles), which are opposed to each other through the permanent magnet 80 placed therebetween, are formed on the leading end portion of the rod-like inside yoke 123 and the leading end portions of the magnetic pole-guide pieces 121 and 122 of the outside yoke 121 (122).

Moreover, as shown in FIGS. 10A and 10B, the external circumference portion of the magnet rotor M having a hollow, cylindrical shape is magnetized into four poles, and the driving pin 61 is disposed so that it is located overlapping one of the polarized portions. In other words, the magnet rotor M magnetized into four poles is restricted in its rotational region by the long and narrow hole (slit) 44 or 45 of the base 40 so that it swings clockwise and counterclockwise by the predetermined angle around the location of polarization.

Therefore, when the N pole develops on the magnetic pole-guide pieces 121 and 122 and the S pole develops on the inside yoke 123 as shown in FIG. 10A, the N pole of the magnetic pole-guide pieces 121 and 122 and the S pole of the magnet rotor M are magnetically attracted to each other and concurrently the N pole of the magnet rotor M is magnetically repelled. Thus the magnet rotor M rotates counterclockwise.

The rotation of the magnet rotor M is stopped at a location where the driving pin 61 abuts against the long and narrow hole (slit) 44 or 45 of the base 40. At this location, even when application of electric current to the excitation coil 110 is stopped (turned OFF), the magnetic pole (S pole) of the magnet rotor M is located at a location near (adjacent) the magnetic pole-guide pieces 121, 122 and as such, the permanent magnet 80 of the magnet rotor M is attracted by the magnetic pole-guide pieces 121, 122 of a magnetic substance and is kept held at the location.

Next, when an electric current in the reverse direction is supplied to the excitation coil 110, S poles are formed on the magnetic pole-guide pieces 121 and 122 of the outside yoke 121 (122) and N pole is formed on the inside yoke 123, as shown in FIG. 10B. In this condition, S poles on the magnetic pole-guide pieces 121 and 122 are magnetically attracted by the N pole of the magnet rotor M, and the S pole of the rotor is repelled magnetically. Thus, the magnet rotor M rotates clockwise, and continues rotating until the driving pin 61 is restricted by the long and narrow hole (slit) 44 or 45 of the base 40 and is stopped.

Even when application of electric current to the excitation coil 110 is stopped in this condition, the N pole of the magnet rotor M is attracted by the magnetic pole-guide pieces 121 and 122 of a magnetic substance, and the magnet rotor M is held in the condition where the driving pin 61 is engaged and stopped by an edge of the long and narrow hole (slit) 44 or 45, as in the case described above. Therefore, the light-limiting blade 20 may remain in position when the application of electric current to the excitation coil 110 is turned OFF by disposing a constituent of the outside yoke 121 (122) in at least one location or two opposite locations in the manner as stated above, and not by providing the outside yoke 121 (122) for the whole external circumference of the permanent magnet 80, included by the magnet rotor M.

In the embodiment described above, a permanent magnet 80 is magnetized into four poles. However, the magnet may be magnetized into four poles in its circumferential direction and magnetized so that N-S poles are formed in its radial direction. With such arrangement, the direction of a rotation force created by magnetic attraction between the poles on the internal circumference side of the magnet rotor M and the inside yoke 123 is identical to the direction of rotation force created on the external circumference side of the magnet motor M. As such, the driving torque of the electromagnetically-driving device is increased. Therefore, a large rotation force can be obtained with small electric power consumption.

Figure 12:
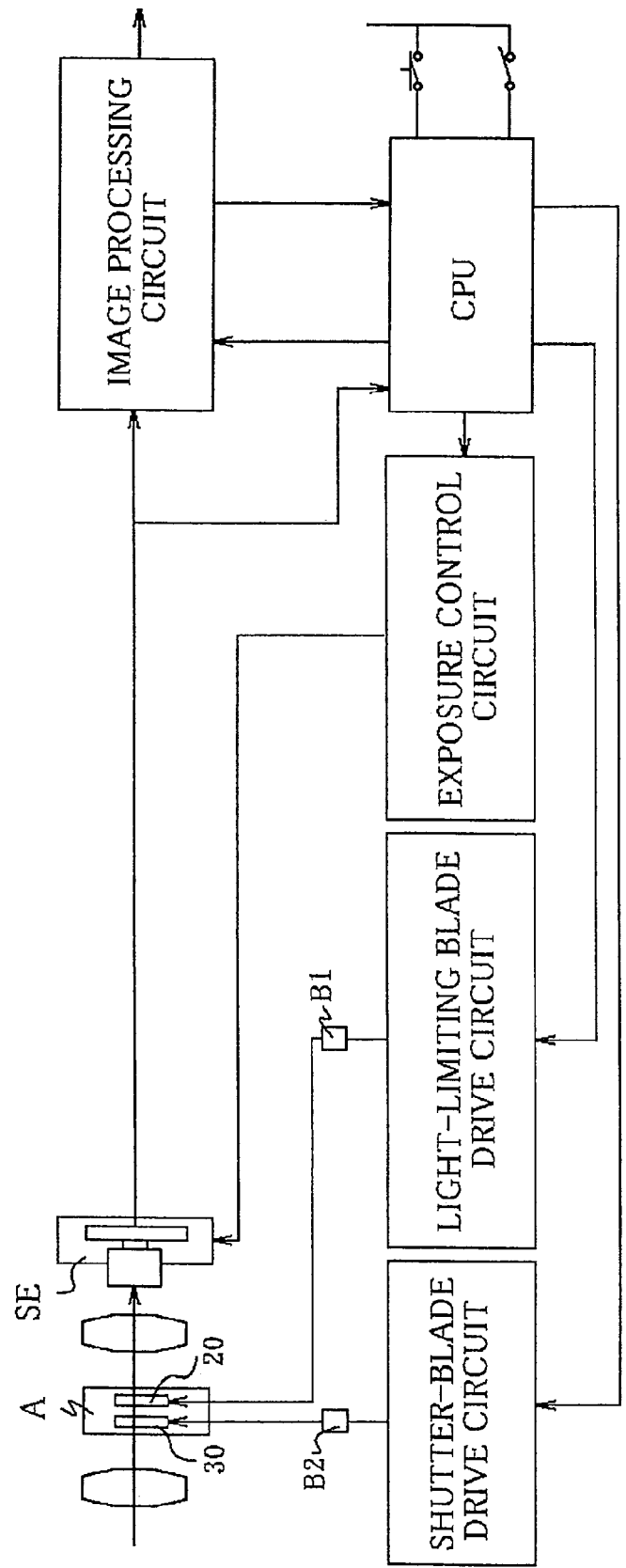
FIG. 12 is a block diagram of an optical apparatus in association with the invention.

Now, the optical apparatus will be described with reference to FIG. 12. As in the drawing, the above-described light quantity-control device A is incorporated in an image pickup means SE such as a CCD. An image signal from the image pickup means SE is captured by an image processing circuit. A light quantity signal from the image processing circuit is subjected to a numerical computation by CPU. CPU controls an exposure control circuit, a light-limiting blade drive circuit and a shutter-blade drive circuit, and according to a proper exposure, drives the electromagnetically-driving device B1 which further drives a light-limiting blade and drives the electromagnetically-driving device B2 that drives a shutter blade, and appropriately controls opening and closing of the light-limiting blade 20 and shutter blade 30.

Concurrently, the image pickup means SE, which has started capture of an image signal according to the exposure control circuit, transfers image data to the image processing circuit after having performed the proper exposure. The image processing circuit forces a display means (not shown) to display the image.

Figure 13:
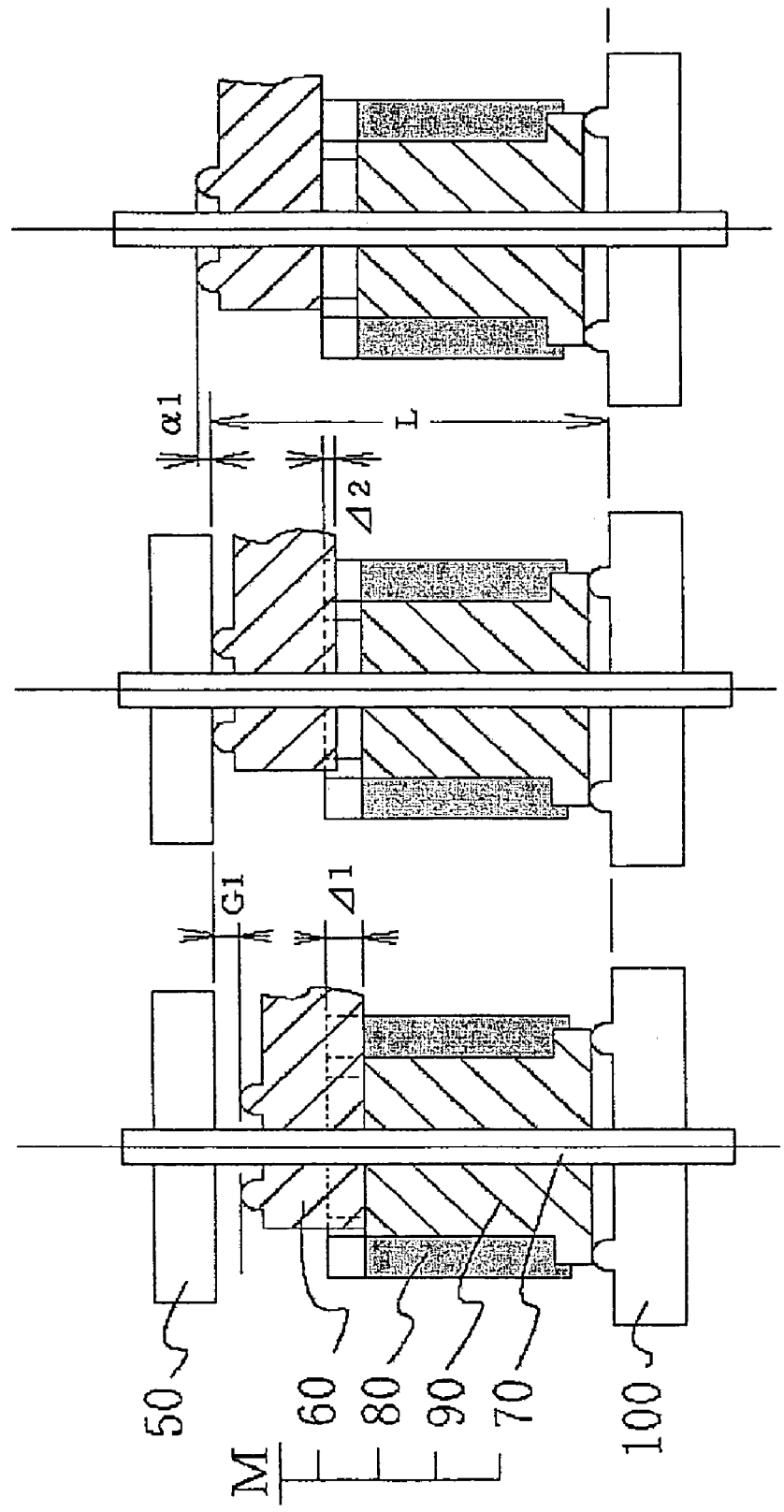
FIGS. 13A-13C are views showing a condition of assembly of the device shown in FIG. 1.

The inside structure of an electromagnetically-driving device, according to the invention, will be presented with reference to FIG. 13. Situation A shows a condition where the driving arm and permanent magnet are connected in a normal condition and are rotatably supported inside the electromagnetically-driving device with a thrust play G1.

Situation B shows that the connection between the driving arm and permanent magnet can be maintained and an operation failure is never caused in the case where the depths of concave parts of the driving arm and permanent magnet and the height of the protrusions engaged with the concavity parts are set in advance so that the distance L, between the securing board and coil frame, prevents the driving arm and permanent magnet from being brought out of connection, even when the connection of the driving arm and permanent magnet is weakened owing to an environmental operation temperature, shock or impact, or the like.

Situation C shows that the condition of Situation B can be maintained when the dimension of the magnet rotor with the driving arm and permanent magnet placed out of connection is made slightly longer than the distance L between the securing board and coil frame by α1.

The description of the above embodiment has been presented for a light quantity-control device assembled in an image-pickup barrel for various camera devices. However, the light quantity-control device hereof can be used in a projection device such as a projector, and optical systems of other optical apparatuses.

As described above, when a driving arm and a hollow cylindrical permanent magnet having a rotary shaft in its center portion are supported between paired upper and lower rotor supporting members so that the permanent magnet and driving arm integrally rotate around the rotary shaft, the permanent magnet and driving arm are fitted to each other using a fitting part composed of a protrusion and a concave part, and the depth of fitting is set so that the length of a combination of the permanent magnet and driving arm is longer than the distance between the upper and lower supporting members, in order to maintain this fitting condition reliably. Thus, after assembled in between the upper and lower rotor supporting members, the fitting parts of the permanent magnet and driving arm, which have been fabricated individually, are reliably coupled with each other without being separated, and thus the permanent magnet and driving arm rotate in one integrated form.

Therefore, the needs for using an adhesive, press-fitting and insert securing as in the past when the permanent magnet and driving arm are integrated, are eliminated, therefore facilitating machining of parts therefore, and makes it possible to downsize a component. Further, a rotor assembly is constructed by: fitting and disposing a core member fitted in a hollow space portion, with respect to a lower end face of a permanent magnet in a hollow shape in its axial direction; arranging a driving arm with respect to the upper end face; and then fitting and connecting fitting parts formed in the permanent magnet and core member to the driving arm. The aforementioned disclosure makes it possible: to mold parts individually; integrating the parts into a magnet rotor, without carrying out post-treatments, such as securing by an adhesive and press-fitting.

While the invention has been explained with reference to the specific embodiments of the invention, the explanation is illustrative and the invention is limited only by the appended claims.

The present application claims priority from Japanese patent application No. 2006-005390 filed on Jan. 12, 2006, which is incorporated herein by reference into this application.

What is claimed is:

1. A magnet rotor comprising:
  a rotary shaft;
  a hollow cylindrical permanent magnet having a center, in which the rotary shaft is disposed, the permanent magnet having a first fitting part formed in an upper end face in a direction of the rotary shaft and composed of one of a protrusion and a concave groove;
  a driving arm rotating around the rotary shaft integrally with the permanent magnet, the driving arm having a second fitting part formed therein and composed of a protrusion or concave groove to mate with the first fitting part; and
  a pair of upper and lower rotor supporting members supporting a rotor assembly including the rotary shaft, permanent magnet, and driving arm;
  wherein a depth of fitting between the first and second fitting parts is set so that a length of a combination of the permanent magnet and driving arm is longer than a length of a distance between a pair of upper and lower supporting faces formed on the paired rotor supporting members when the rotor assembly is supported between the paired upper and lower supporting faces.

2. The magnet rotor according to claim 1, wherein the paired upper and lower rotor supporting members each include a frame substrate having the upper and lower supporting faces; the rotary shaft is supported between the frame substrates; and the permanent magnet and driving arm are mounted between the paired upper and lower supporting faces through the rotary shaft.

3. The magnet rotor according to claim 1, wherein the upper and lower rotor supporting members includes frame substrates abutting against the permanent magnet or driving arm, and a core member fitted and disposed in a hollow space of the permanent magnet; the core member is provided with a third fitting part comprising a protrusion or concave groove and is configured to mate with the second fitting part formed in the driving arm; the second fitting part formed in the driving arm is fitted to the first and third fitting parts so that the rotor assembly is supported between the paired rotor supporting members.

4. The magnet rotor according to claim 3, wherein the core member and rotary shaft are formed from high magnetic permeability metal materials.

5. The magnet rotor according to claim 3, wherein the core member is provided with a collar part configured to hold a lower end face of the permanent magnet in a direction of the rotary shaft, and the permanent magnet is held between the driving arm and core member.

6. The magnet rotor according to claim 3, wherein the core member has a sleeve form fitted in a hollow cylinder of the permanent magnet.

7. An electromagnetically-driving device, comprising:
a hollow cylindrical permanent magnet having an internal circumferential face, an external circumferential face, and a first fitting part formed in an upper end face and comprising one of a protrusion and a concave groove;
a rotary shaft forming a rotation center of the permanent magnet so that the permanent magnet is supported between a pair of upper and lower rotor supporting members through the rotary shaft;
a driving arm rotating integrally with the permanent magnet, and including a second fitting part formed therein and comprising a protrusion or concave groove configured to mate with the first fitting part;
an inside yoke disposed on a side of the internal circumferential face of the permanent magnet, the inside yoke including a core member fitted and disposed to a hollow-side internal circumferential face of the permanent magnet and having a bearing-fit bore, the core member including a third fitting part having a form substantially identical to a form of the first fitting part formed in the permanent magnet;
an outside yoke disposed on a side of the external circumferential face of the permanent magnet, the outside yoke including a pair of magnetic pole-guide pieces made of a soft magnetic material and opposed to each other so that magnetic poles formed in the permanent magnet is located therebetween; and
an excitation coil configured to generate a magnetic field in the inside and outside yokes;
wherein depths of fitting of the first fitting part and the second and third fitting parts are set so that a length of a combination of the permanent magnet, driving arm and core member is longer than a supporting distance of the paired upper and lower rotor supporting members; and the permanent magnet and driving arm are rotatably supported between the paired rotor supporting members.

8. A light quantity-control device comprising:
a substrate having an optical-axis aperture;
a blade member attached on the substrate and configured to restrict the optical-axis aperture; and
the electromagnetically-driving device, according to claim 7, for driving the blade member.

* * * * *